United States Patent
Parvazi et al.

(10) Patent No.: US 9,820,272 B1
(45) Date of Patent: Nov. 14, 2017

(54) METHODS AND DEVICES FOR PERFORMING DUPLEX MODE DETECTION

(71) Applicant: Intel IP Corporation, Santa Clara, CA (US)

(72) Inventors: Pouyan Parvazi, Dresden (DE); Tianyan Pu, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/183,866

(22) Filed: Jun. 16, 2016

(51) Int. Cl.
| | | |
|---|---|---|
| H04J 11/00 | (2006.01) | |
| H04W 72/04 | (2009.01) | |
| H04L 5/14 | (2006.01) | |
| H04W 84/12 | (2009.01) | |
| H04W 56/00 | (2009.01) | |
| H04W 48/16 | (2009.01) | |

(52) U.S. Cl.
CPC ....... *H04W 72/042* (2013.01); *H04J 11/0069* (2013.01); *H04J 11/0089* (2013.01); *H04L 5/14* (2013.01); *H04J 11/0073* (2013.01); *H04J 11/0076* (2013.01); *H04W 48/16* (2013.01); *H04W 56/00* (2013.01); *H04W 84/12* (2013.01)

(58) Field of Classification Search
CPC ............... H04J 11/0073; H04J 11/0076; H04J 11/0069; H04J 11/0089; H04W 48/16; H04W 56/00; H04W 72/042; H04W 84/12; H04L 5/14
See application file for complete search history.

(56) References Cited

U.S. PATENT DOCUMENTS

| | | | | |
|---|---|---|---|---|
| 8,599,828 | B2 * | 12/2013 | Fine | H04J 11/0076 370/350 |
| 8,798,208 | B2 * | 8/2014 | Shin | H04L 7/042 375/259 |
| 2008/0316947 | A1 * | 12/2008 | Lindoff | H04J 11/0069 370/294 |
| 2011/0103534 | A1 * | 5/2011 | Axmon | H04J 11/0069 375/371 |
| 2012/0046056 | A1 * | 2/2012 | Luo | H04J 11/005 455/502 |

(Continued)

OTHER PUBLICATIONS

Gao et al. "A Modified Algorithm of Synchronization Signal Detection for LTE Initial Cell Search", Aug. 2011, IEEE, pp. 1211-1215.*

(Continued)

*Primary Examiner* — Sophia Vlahos
(74) *Attorney, Agent, or Firm* — Viering, Jentschura & Partner mbB

(57) ABSTRACT

A circuit arrangement may include a first detection circuit configured to evaluate signal data of a carrier channel to identify a timing location of a synchronization signal within the signal data, a second detection circuit configured to, using the timing location as a reference point, extract a first candidate synchronization signal from a first candidate timing location of the signal data and to extract a second candidate synchronization signal from a second candidate timing location of the signal data, and a decision circuit configured to analyze the first detection synchronization signal and the second candidate synchronization signal to determine a duplex mode of the carrier channel.

19 Claims, 8 Drawing Sheets

(56) References Cited

U.S. PATENT DOCUMENTS

| | | | |
|---|---|---|---|
| 2013/0039268 A1* | 2/2013 | Blankenship | H04W 56/0015 370/328 |
| 2013/0142060 A1* | 6/2013 | Challa | H04B 1/70755 370/252 |
| 2014/0334478 A1* | 11/2014 | Cheng | H04L 27/261 370/350 |

OTHER PUBLICATIONS

Katumba et al.: "The LTE Access Procedure", 2011, vol. 6, 6 pages, Department of Signals and Systems, Chalmers University of Technology, Gothenburg, Schweden.

Kim et al.: "SSS Detection Method for Initial Cell Search in 3GPP LTE FDD/TDD Dual Mode Receiver", Communications and Information Technology, 2009, pp. 199-203, ISCIT 2009, 9th International Symposium Sep. 28-30, 2009, Sungkyunkwan University, Suwon, Korea.

3GPP TS 36.211 V 13.1.0, 3rd Generation Partnership Project, "Technical Specification Group Radio Access Network; Evolved Universal Terrestrial Radio Access (E-UTRA); Physical channels and modulation",Section 6. 11, Mar. 2016, pp. 129-132, Release 13, 3GPP, Valbonne; France.

\* cited by examiner

METHODS AND DEVICES FOR PERFORMING DUPLEX MODE DETECTION

TECHNICAL FIELD

Various embodiments relate generally to methods and devices for performing duplex mode detection.

BACKGROUND

Long Term Evolution (LTE) networks may conventionally separate uplink and downlink resources according to either time-division duplexing (TDD) or frequency-division duplexing (FDD). TDD LTE networks may utilize the same frequency resources, i.e. the same band, for both uplink and downlink communications and may alternate between uplink time periods and downlink time periods. Conversely, FDD networks may utilize separate uplink and downlink frequency bands. TDD networks may thus offer more efficient frequency usage while FDD networks may reduce latency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
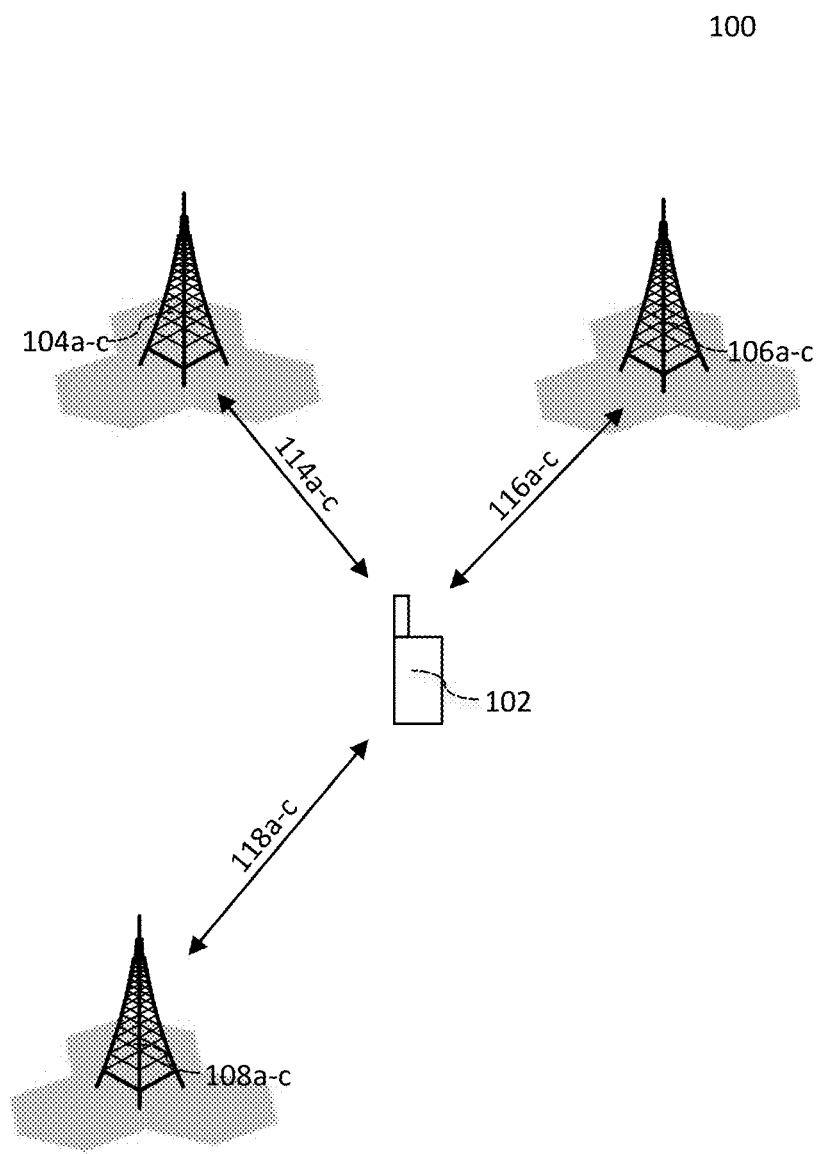
FIG. 1 shows a radio communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description and the claims expressly refer to a quantity greater than one. The terms "group (of)", "set [of]", "collection (of)", "series (of)", "sequence (of)", "grouping (of)", etc., and the like in the description and in the claims, if any, refer to a quantity equal to or greater than one, i.e. one or more. Any term expressed in plural form that does not expressly state "plurality" or "multiple" refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

Mobile terminals in LTE networks (also referred to as User Equipment (UE)) may need to perform frequency and cell scans in order to detect and identify nearby LTE cells. For example, a mobile terminal that has just completed a power-up procedure or is recovering from a coverage failure scenario may need to scan LTE center frequencies in order to detect which center frequencies are being actively utilized by an LTE network. The mobile terminal may then need to individually evaluate each detected active center frequency to assess whether any of the carrier frequencies contain LTE cells that are available for a radio connection.

A mobile terminal may need to perform a frequency scan over multiple LTE Operating Bands, which may each be frequency ranges defined by the $3^{rd}$ Generation Partnership Project (3GPP) that are each composed of a predefined set of center frequencies that may be utilized by an LTE network. Each center frequency of each LTE Operating Band may be identified by an Evolved Universal Terrestrial Radio Access (E-UTRA) Absolute Radio Frequency Channel Number (EARFCN) that identifies the center frequency. Depending on factors such as device and network configuration, a mobile terminal may search one or more LTE Operating Bands during frequency and cell scan procedures in order to detect active center frequencies and identify any valid LTE cells operating thereon.

Accordingly, during frequency and cell scan procedures a mobile terminal may first perform a wideband radio measurement (such as e.g. a Received Signal Strength Indicator (RSSI) measurement) on each center frequency of the one or more targeted LTE Operating bands in order to detect whether there is radio activity on each center frequency. Upon identifying a set of center frequencies on each Operating Band that each contain radio activity (e.g. center frequencies that produced a high RSSI measurement), the mobile terminal may perform a cell scan procedure on each center frequency in order to detect and identify any active LTE cells on each center frequency. The mobile terminal may aim to identify cells that are LTE cells (as opposed to UMTS cells) and that belong to a desired LTE network, such as e.g. the Home Public Land Mobile Network (HPLMN) of the mobile terminal. Such may involve determining the identity of any active cells by detecting synchronization signals and subsequently identifying which PLMN any detected LTE cells belong to by reading System Information Blocks (SIBs).

Each LTE cell may operate according to either Time Division Duplexing (TDD) or Frequency Division Duplexing (FDD) in order to separate the time-frequency resources used for uplink and downlink. More specifically, TDD networks may use the same frequency resources for both uplink and downlink and alternate between uplink time periods and downlink time periods while FDD networks may utilize separate uplink and downlink frequency bands simultaneously. Both duplexing modes may offer distinct advantages and disadvantages, such as the low-latency of FDD networks compared to the spectral efficiency of TDD networks. Each LTE Operating Band specified by the 3GPP may be either an FDD band or a TDD band; accordingly, network operators may be able to deploy TDD networks on the EARFCNs of TDD Operating Bands while FDD networks on the EARFCNs of FDD Operating Bands.

In order to provide high flexibility to network operators, the 3GPP has defined the LTE Operating Bands such that certain Operating Bands overlap, i.e. such that certain frequency ranges are eligible for both FDD and TDD operation. For example, certain FDD Operating Bands may contain the same physical spectrum as certain TDD Operating Bands and, as a result, certain EARFCNs of the FDD Operating Bands may correspond to the same physical center frequency of EARFCNs of the TDD Operating Bands. Consequently, it may be possible for a given network operator to utilize a given physical center frequency to deploy an FDD network in a certain geographic area (e.g. a country) while another network operator may utilize the same physical center frequency to deploy a TDD network in a different geographic area (e.g. another country). While the FDD and TDD networks may be deployed on different EARFCNs (on differing LTE Operating Bands), such may only be a 'logical' distinction as the same physical center frequency may be utilized for both networks.

As certain physical center frequencies may be utilized for either TDD or FDD deployment, a mobile terminal may not be able to easily determine whether a given center frequency that produces a high RSSI measurement is being used for a TDD or FDD LTE network. Accordingly, a mobile terminal may need to perform further evaluation in order to determine the duplexing mode of a given center frequency. In a conventional solution, a mobile terminal may simply perform a first cell scan that assumes the given center frequency is supporting a TDD network and subsequently perform a second cell scan that assumes the given center frequency is supporting an FDD network (or vice versa). Depending on which assumption is correct, the mobile terminal may detect real cells during one cell scan and no cells (or ghost cells) during the other cell scan. The cell scan that produces real cells may thus be assumed to correspond to the actual duplexing mode of the center frequency.

However, such conventional solutions may be inefficient in terms of both power consumption and time as two separate cell scans are needed to determine the duplexing mode. Accordingly, in an advantageous solution of this disclosure a mobile terminal may instead perform specialized processing during a single cell scan in order to detect the duplex mode of a given center frequency. Specifically, a mobile terminal may capture downlink data received from cells on the given center frequency and evaluate the captured downlink data in light of specific properties of synchronization sequences transmitted by cells in order to detect the duplex mode. As the synchronization sequences transmitted by FDD and TDD cells may differ in a distinct manner, a mobile terminal may therefore be able to differentiate between FDD and TDD cells and consequently detect the duplex mode within a single cell scan.

FIG. 1 shows an exemplary scenario depicting a frequency and cell scan context for a mobile terminal 102 in a cellular network 102. In the exemplary scenario of FIG. 1, mobile terminal 102 may be located proximate to base stations 102, 106, and 108. Each of base stations 104-108 may be sectorized (e.g. with respective sectorized antenna systems) in to multiple cells such as cells 104a, 104b, and 104c for base station 104, cells 106a, 106b, and 106c for base station 106, and cells 108a, 108b, and 108c for base station 108. The wireless channels 114a-114c, 116a-116c, and 118a-118c may represent the discrete wireless channels between each of respective cells 104a-104c, 106a-106c, and 108a-108c.

Mobile terminal 102 may perform cell search by searching for cells on each target center frequency of the target center frequency set. In the exemplary context of FIG. 1, each of cells 104a-104c, 106a-106c, and 108a-108c may each utilize a first target center frequency for downlink transmissions. Although not explicitly shown in FIG. 1, each of base stations 104-108 may additionally include cells 104d-104f for base station 104, cells 106d-106f for base station 106, and cells 108d-108f for base station 108, which may each utilize a second target center frequency for downlink transmissions, and so forth for a third, fourth, etc., target center frequency.

Figure 2:
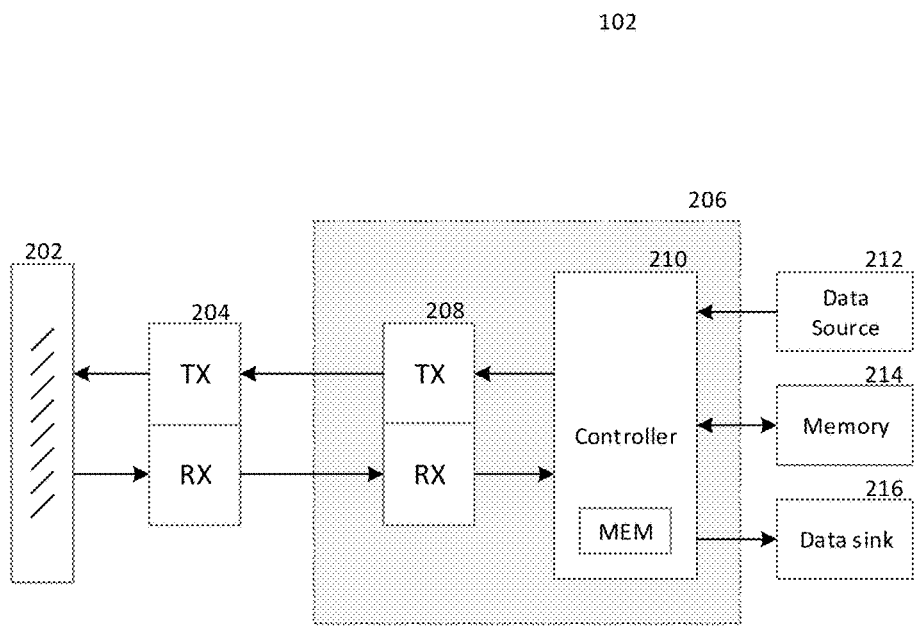
FIG. 2 shows an internal configuration of a mobile communication device.

FIG. 2 shows an internal configuration of mobile terminal 102, which may include antenna system 202, radio frequency (RF) transceiver 204, baseband modem 206 (including physical layer processing circuit 208 and controller 210), data source 212, memory 214, and data sink 216. Although not explicitly shown in FIG. 2, mobile terminal 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, mobile terminal 102 may transmit and receive radio signals on one or more radio access networks. Baseband modem 206 may direct such communication functionality of mobile terminal 102 according to the communication protocols associated with each radio access network, and may execute control over antenna system 202 and RF transceiver 204 in order to transmit and receive radio signals according to the formatting and scheduling parameters defined by each communication protocol.

Mobile terminal 102 may transmit and receive radio signals with antenna system 102, which may be a single antenna or an antenna array composed of multiple antennas and may additionally include analog antenna combination and/or beamforming circuitry. In the receive path (RX), RF transceiver 204 may receive analog radio frequency signals from antenna system 202 and perform analog and digital RF front-end processing on the analog radio frequency signals to produce digital baseband samples (e.g. In-Phase/Quadrature (IQ) samples) to provide to baseband modem 204. RF transceiver 204 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 206 to produce the analog radio frequency signals for wireless transmission by antenna system 202.

As shown in FIG. 2, baseband modem 206 may include physical layer processing circuit 208, which may perform physical layer (Layer 1) transmission and reception processing to prepare outgoing transmit data provided by controller 210 for transmission via RF transceiver 204 and prepare incoming received data provided by RF transceiver 204 for processing by controller 210. Physical layer processing circuit 210 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 208 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 2, physical layer processing circuit 208 may include a control circuit such as a processor configured to control the various hardware and software processing components of physical layer processing circuit 208 in accordance with physical layer control logic defined by the communications protocol for the relevant radio access technologies. Furthermore, while physical layer processing circuit 208 is depicted as a single component in FIG. 2, physical layer processing circuit 208 may be collectively composed separate sections of physical layer processing circuitry where each respective section is dedicated to the physical layer processing of a particular radio access technology.

Mobile terminal 102 may be configured to operate according to one or more radio access technologies, which may be directed by controller 210. Controller 210 may thus be responsible for controlling the radio communication components of mobile terminal 102 (antenna system 202, RF transceiver 204, and physical layer processing circuit 208) in accordance with the communication protocols of each supported radio access technology, and accordingly may represent the Access Stratum and Non-Access Stratum (NAS) (also encompassing Layer 2 and Layer 3) of each supported radio access technology. Controller 210 may be structurally embodied as a protocol processor configured to execute protocol software (retrieved from controller memory MEM as shown in FIG. 2) and subsequently control the radio communication components of mobile terminal 102 in order to transmit and receive communication signals in accordance with the corresponding protocol control logic defined in the protocol software.

Controller 210 may therefore be configured to manage the radio communication functionality of mobile terminal 102 in order to communicate with the various radio and core network components of radio communication network 100, and accordingly may be configured according to the communication protocols for both the LTE network and the GSM/UMTS legacy network. Controller 210 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 210 may be responsible for directing radio communication activity of mobile terminal 102 according to the communication protocols of the LTE and legacy networks. As previously noted regarding physical layer processing circuit 208, one or both of antenna system 202 and RF transceiver 204 may similarly be partitioned into multiple dedicated components that each respectively correspond to one or more of the supported radio access technologies. Depending on the specifics of each such configuration and the number of supported radio access technologies, controller 210 may be configured to control the radio communication operations of mobile terminal 102 in accordance with a master/slave RAT hierarchical or multi-SIM scheme.

Mobile terminal 102 may further comprise data source 212, memory 214, and data sink 216, where data source 212 may include sources of communication data above controller 210 (i.e. above the NAS/Layer 3) and data sink 212 may include destinations of communication data above controller 210 (i.e. above the NAS/Layer 3). Such may include, for example, an application processor of mobile terminal 102, which may be configured to execute various applications and/or programs of mobile terminal 102 at an application layer of mobile terminal 102, such as e.g. an Operating System (OS), a User Interface (UI) for supporting user interaction with mobile terminal 102, and/or various user applications. The application processor may interface with baseband modem 206 (as data source 212/data sink 216) as an application layer to transmit and receive user data such as voice data, audio/video/image data, messaging data, application data, basic Internet/web access data, etc., over a the radio network connection(s) provided by baseband modem 206. Data source 212 and data sink 216 may additionally represent various user input/output devices of communication device 102, such as display(s), keypad(s), touchscreen(s), speaker(s), external button(s), camera(s), microphone(s), etc., which may allow a user of mobile terminal 102 to control various communication functions of mobile terminal 102 associated with user data.

Memory 214 may embody a memory component of mobile terminal 102, such as e.g. a hard drive or another such permanent memory device. Although not explicitly depicted in FIG. 2, the various other components of mobile terminal 102 shown in FIG. 2 may additionally each include integrated permanent and non-permanent memory components, such as for storing software program code, buffering data, etc.

Mobile terminal 102 may be configured to perform frequency and cell scans on radio communication network 100, which as previously detailed may include performing wideband radio measurements on the center frequencies of one or more LTE Operating Bands in order to detect active center frequencies and subsequently performing cell scans on the detected active center frequencies in order to detect any valid cells. In contrast to the conventional 'duplicate cell scan' duplex detection procedure introduced above, mobile terminal 102 may be configured to perform specialized physical layer processing on downlink data received on a given target center frequency in order to detect duplex mode based on the differences between the synchronization sequences transmitted by FDD and TDD cells.

As specified by the 3GPP, each LTE cell may transmit a synchronization sequence pattern in the form of a Primary Synchronization Signal (PSS) sequence and a Secondary Synchronization Signal (SSS) sequence. Mobile terminals may utilize such synchronization sequence patterns in order to identify and to establish timing synchronization with LTE cells. Specifically, each LTE cell may be assigned a Physical Cell Identity (PCI, ranging from 0-503) and may transmit a PSS-SSS sequence pair that uniquely identifies the PCI of the cell, which may allow a mobile terminal to determine the PCI of a given LTE cell by identifying the PSS-SSS sequence pair transmitted by the LTE cell. For example, each LTE cell may transmit one of a predefined set of 3 PSS sequences along with one of a predefined set of 168 SSS sequences, thus yielding the 504 possible PSS-SSS sequence pairs that each individually identify a PCI. LTE cells may transmit the PSS-SSS sequence pair according to a predefined period of 5 ms, thus allowing a mobile terminal to utilize a detected PSS-SSS sequence pair to obtain a reference point to synchronize communications with a given LTE cell.

Figure 3:
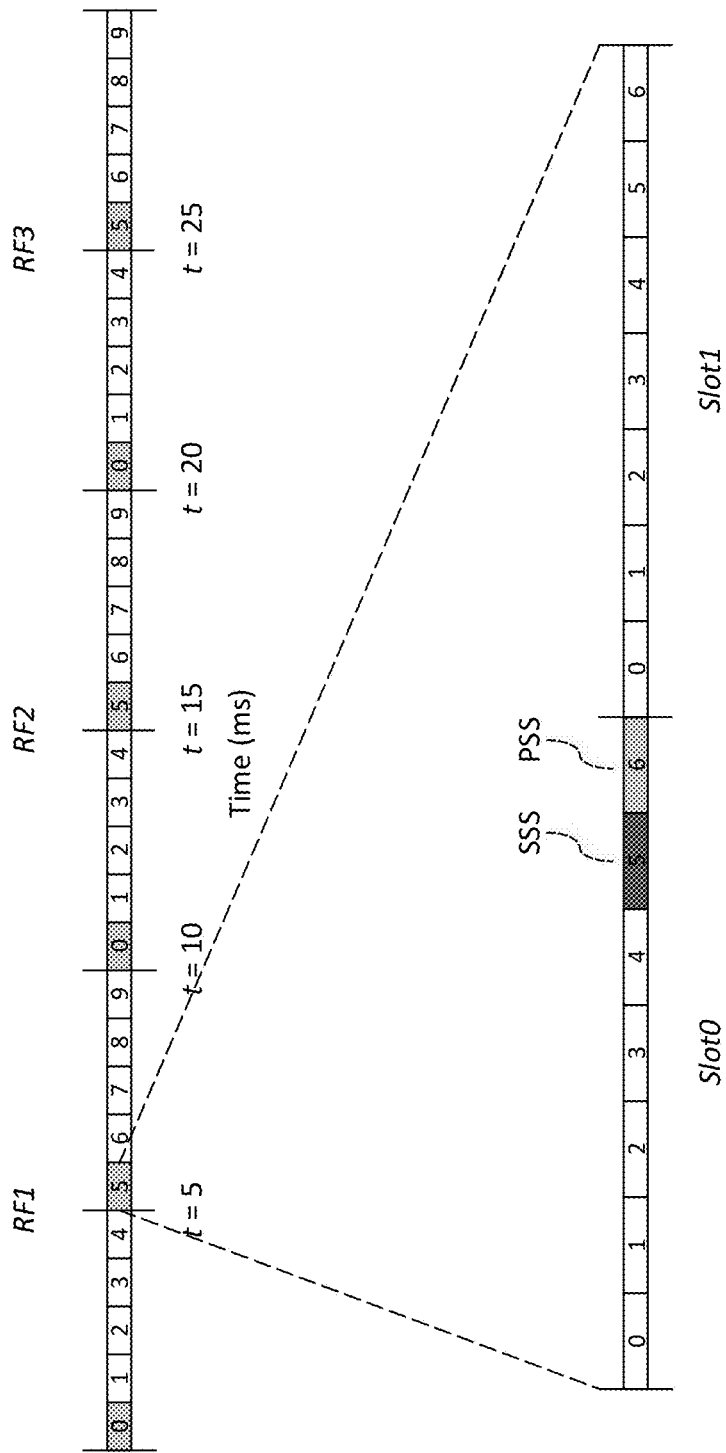
FIG. 3 shows a Frequency Division Duplexing (FDD) synchronization sequence pattern.
Figure 4:
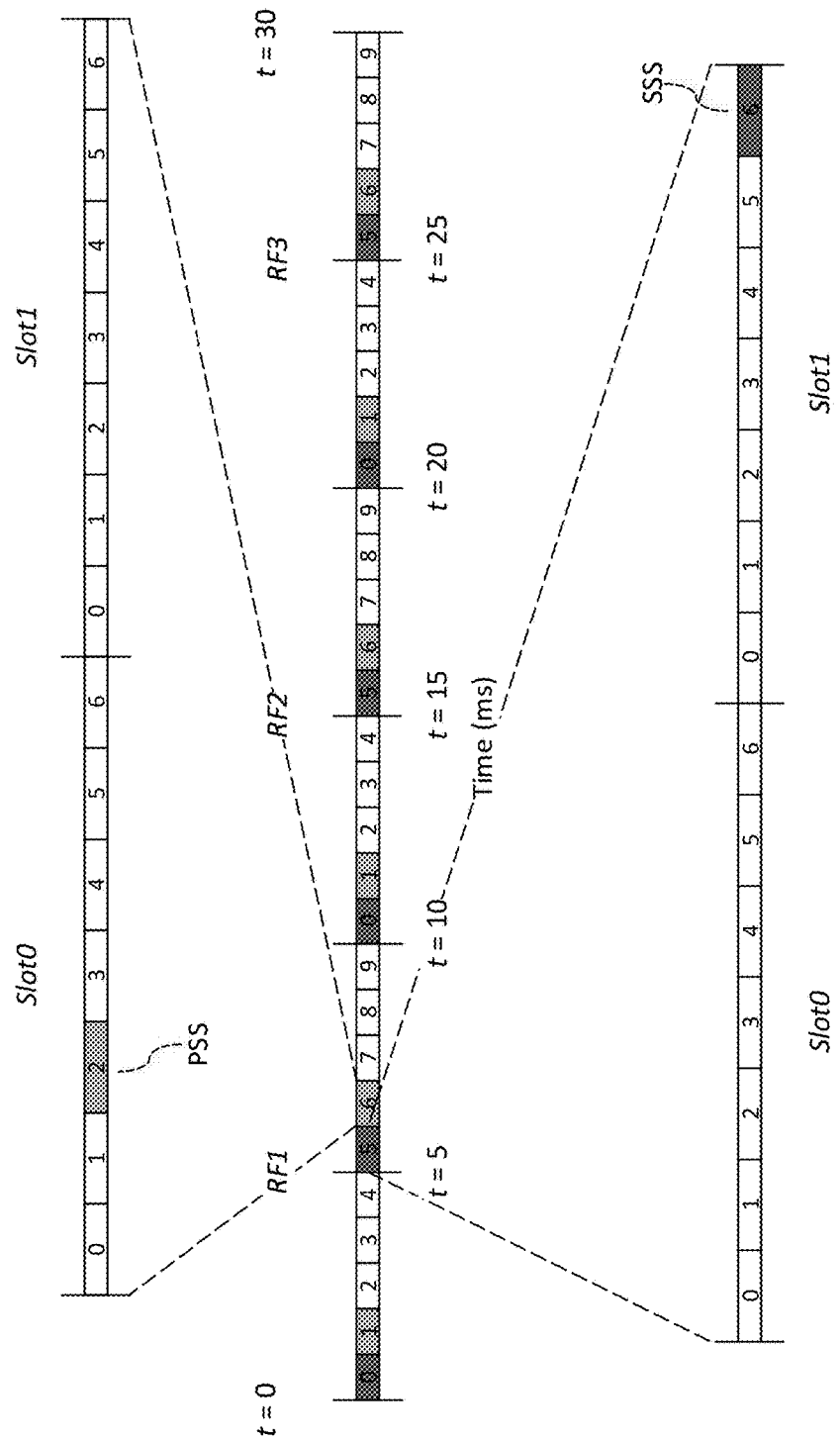
FIG. 4 shows a Time Division Duplexing (TDD) synchronization sequence pattern.

As previously indicated, FDD cells may transmit PSS-SSS sequence pairs according to a different scheme than TDD cells. FIGS. 3 and 4 illustrate the transmission patterns of PSS and SSS sequences by FDD and TDD cells, respectively. As shown in FIGS. 3 and 4, LTE cells may transmit downlink signals over a series of 10 ms radio frames, where each radio frame is divided into 10 subframes each of 1 ms duration. Each subframe may be divided two slots which each contain either 6 or 7 symbol periods depending on the Cyclic Prefix (CP) length. As depicted in FIG. 3, FDD LTE cells may transmit PSS sequences in the last symbol period of the first slot ($6^{th}$ or $7^{th}$ symbol period of the first slot depending on CP length) and an SSS sequence in symbol period before the PSS, and may repeat this fixed symbol pattern over all radio frames. In contrast, as shown in FIG. 4, TDD LTE cells may transmit a PSS sequence in the $3^{rd}$ symbol period of the first slot of the $1^{st}$ and $6^{th}$ subframes of each radio frame. LTE cells may then transmit an SSS sequence in the last symbol period of the second slot of the $0^{th}$ and $5^{th}$ subframes ($6^{th}$ or $7^{th}$ symbol period of the second slot depending on CP length). The separation in time between transmitted PSS and SSS sequences may thus vary as a function of both duplexing mode and CP length.

In accordance with the Orthogonal Frequency Division Multiplexing (OFDM) scheme employed for downlink in LTE, each LTE cell may transmit downlink signals over a set of subcarriers, where each set of 12 contiguous subcarriers (spaced every 15 kHz) are grouped into a resource block. An LTE cell may transmit downlink signals over between 6 and 20 resource blocks (dependent on the particular system bandwidth), where each discrete subcarrier of the utilized resource blocks may transmit a single symbol (per symbol period).

As defined in Section 6.11 of 3GPP Technical Specification 36.211, "Physical channels and modulation", V12.5.0 ("3GPP TS 36.211"), each cell may transmit a PSS and SSS sequence pair that identifies the Physical Cell Identity (PCI) of the cell where the PSS sequence gives the physical-layer identity (ranging from 0 to 2) and the SSS sequence gives the physical-layer cell identity group (ranging from 0 to 167). Mobile terminal 102 may identify the PCI (ranging from 0 to 503) of a given cell by identifying the PSS and SSS sequence transmitted by the cell. Specifically, the PSS sequence index (out of the possible set of 3 predefined PSS sequences) may denote the physical-layer identity $N_{ID}^{(2)}$ while the SSS sequence index (out of the possible set of 168 predefined SSS sequences) may denote the physical-layer cell-identity group $N_{ID}^{(1)}$. The PCI $N_{ID}^{cell}$ may then be given as $N_{ID}^{cell}=3N_{ID}^{(1)}+N_{ID}^{(2)}$ thus allowing mobile terminal 102 to obtain the PCI of a cell by identifying the specific PSS and SSS sequence pair transmitted by the cell. Mobile terminal 102 may utilize the PCI in order to obtain further cell information (such as contained in System Information Blocks (SIBs)) and potentially establish a connection with a given cell.

As further specified in Section 6.11 of 3GPP TS 36.211, each PSS sequence may be a length-62 sequence generated from a frequency-domain Zadoff-Chu root sequence that is mapped to one of the 62 central subcarriers (excluding a central DC subcarrier) of the system bandwidth during the aforementioned PSS symbol period. Each SSS sequence may be a length-62 sequence generated from a frequency-domain pseudorandom noise sequence that is similarly mapped to the 62 central subcarriers during the aforementioned SSS symbol period. Each of the 3 possible PSS sequences and 168 possible SSS sequences are predefined, and thus may be known a priori by mobile terminal 102 and subsequently applied by mobile terminal 102 to compare with received PSS-SSS sequence pairs to identify the PSS-SSS sequence pair (and PCI) of each cell.

As detailed above regarding FIGS. 3 and 4, FDD cells may transmit SSS sequences next to PSS sequences (in the immediately preceding symbol) while TDD cells may transmit SSS sequences apart from PSS sequences (three symbols prior to the PSS sequence). As opposed to performing the duplicate cell scan in order to detect duplex mode, mobile terminal 102 may instead utilize the difference in separation of the PSS-SSS sequence pairs of FDD and TDD cells in order to detect the duplex mode. As will be detailed, such may reduce both power efficiency and cell scan time.

Mobile terminal 102 may perform this duplex mode detection processing at physical layer processing circuit 208, which may operate under the control of controller 210. Prior to performing the duplex mode detection procedure on a target center frequency, mobile terminal 102 may first need to perform a frequency scan over one or more LTE Operating Bands in order to identify active center frequencies. Such may be important in scenarios such as power-on sequences or recovery from coverage failure, in which mobile terminal 102 may need to perform a 'fresh' scan to identify which center frequencies contain proximate LTE cells. Accordingly, controller 210 may identify initial target center frequencies (which may be on one or more LTE Operating Bands) and direct RF transceiver 204 and physical layer processing circuit 208 to perform a wideband (e.g. RSSI) measurement on the initial target center frequencies, which may include directing RF transceiver 204 to iteratively step through each of the initial target center frequencies and provide downlink signal data to physical layer processing circuit 208 for wideband radio measurement (e.g. at a measurement circuit of physical layer processing circuit 208, not explicitly shown in FIG. 2). Physical layer processing circuit 208 may perform the wideband radio measurements with the signal data from each initial target center frequency and report the radio measurements to controller 210, which may determine which of the initial target center frequencies contain radio activity based on the radio measurements (e.g. by comparing the radio measurements to a threshold to identify which initial target center frequencies produce high radio measurements).

Controller 210 may thus identify one or more target center frequencies (out of the initial target center frequencies) that contain radio activity. Controller 210 may then trigger cell search on each of the target center frequencies at physical layer processing circuit 208. Physical layer processing circuit 208 may then perform cell search on each of the target center frequencies to identify any viable cells and obtain various information about each of the viable cells. For example, physical layer processing circuit 208 may determine a cell identify (e.g. PCI), duplex mode, CP length, network identity (e.g. PLMN), etc., for each cell detected during cell search.

As previously indicated, certain center frequencies may be eligible for both FDD and TDD deployment (i.e. center frequencies that correspond to EARFCNs in both an FDD and TDD Operating Band). As the wideband radio measurements may only provide a general indication of radio activity, controller 210 may not be able to easily identify the duplex mode of these 'overlapping' center frequencies (as referred to herein). In order to reduce power consumption and cell scan time, mobile terminal 102 may employ a duplex mode detection procedure that avoids performing duplicate cell search on each overlapping center frequency, i.e. each center frequency that is eligible for both TDD and FDD deployment (i.e. appears in both an FDD Operating Band and a TDD Operating Band).

Figure 5:
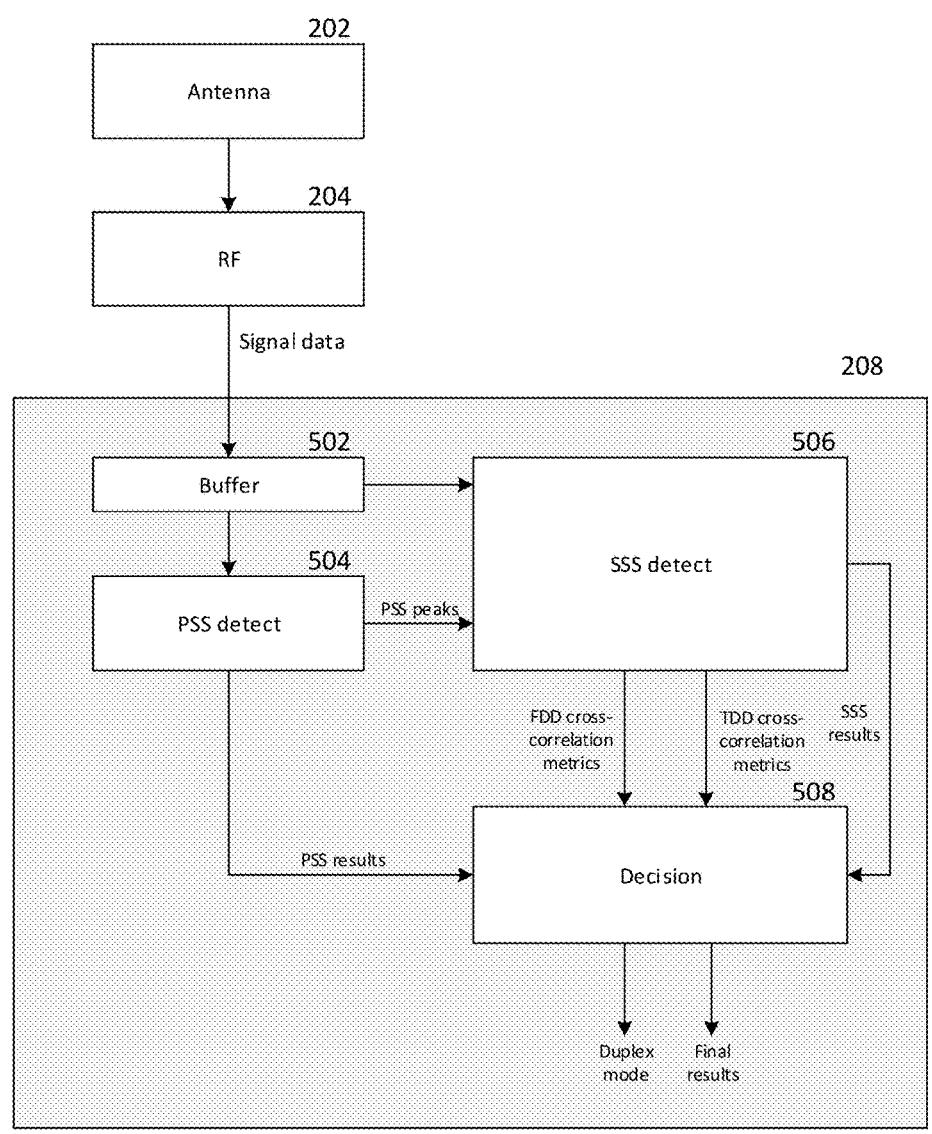
FIG. 5 shows a circuit arrangement for performing radio scans.

FIG. 5 shows illustrates the internal components of mobile terminal 102 related to the duplex mode detection procedure, including an internal configuration of physical layer processing circuit 208. Physical layer processing circuit 208 may contain a variety of additional physical layer processing elements that are omitted in FIG. 5 for to ensure drawing clarity. Control, clock, and power lines are likewise omitted. As shown in FIG. 5, physical layer processing circuit 208 may include search probe buffer 502, PSS detection circuit 504, SSS detection circuit 506, and decision circuit 508. As will be detailed, physical layer processing circuit 208 may be configured to detect candidate PSS timing locations (or 'peaks') for a target center frequency with PSS detection circuit 504, evaluate the PSS timing locations according to both an FDD SSS location hypothesis and a TDD SSS location hypothesis with SSS detection circuit 506, and determine which of the FDD SSS location hypothesis or the TDD SSS location hypothesis is correct to identify the duplex mode of the target center frequency with decision circuit 508. Each of PSS detection circuit 504, SSS detection circuit 506, and decision circuit 508 may be structurally realized/embodied as hardware logic, e.g. as an integrated circuit or FPGA, as software logic, e.g. as a processor executing program code that defining arithmetic, control, and I/O instructions stored in a non-transitory computer-readable storage medium, or as a combination of hardware and software logic. Search probe buffer 502 may be realized as a memory device.

Figure 6:
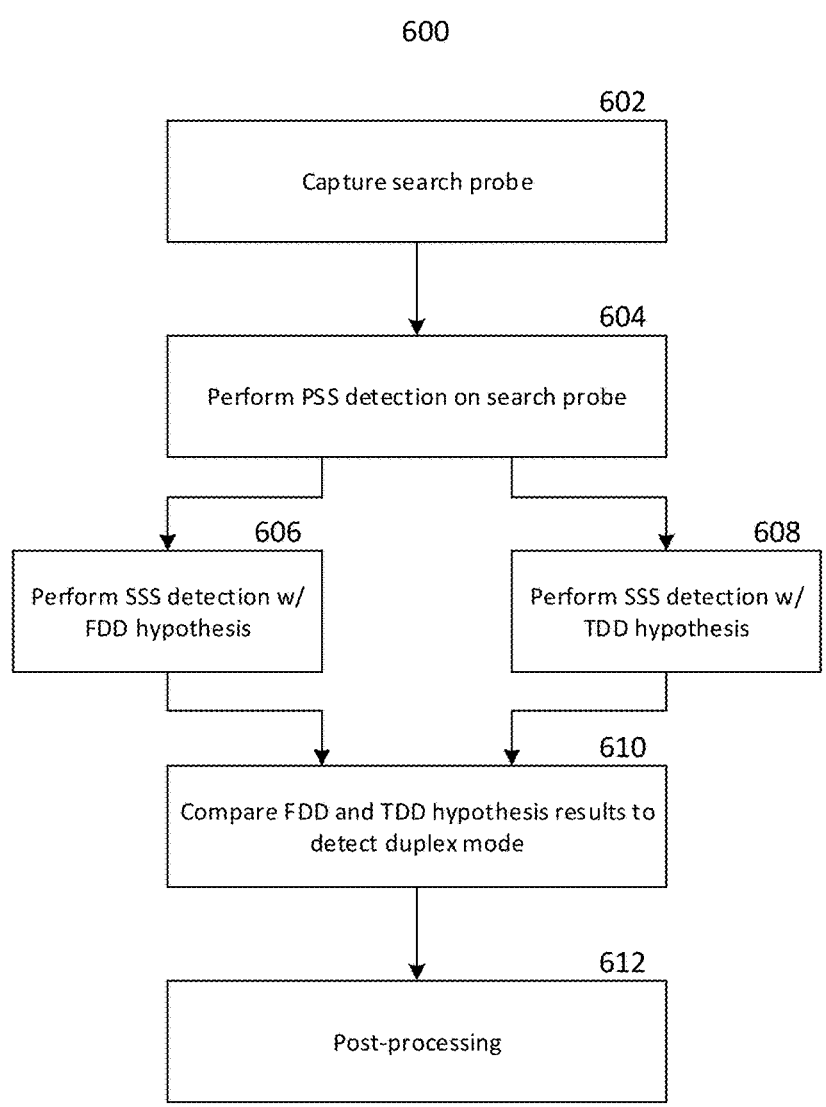
FIG. 6 shows a method of performing duplex detection during radio scans.

FIG. 6 shows method 600, which details the duplex mode detection procedure performed by physical layer processing circuit 208. Controller 210 may initially indicate a center frequency targeted for cell search to physical layer processing circuit 208. Controller 210 may additionally specify that the target center frequency is an overlapping center frequency, i.e. a center frequency that is eligible for both FDD and TDD deployment. Such may trigger the duplex mode detection procedure at physical layer processing circuit 208; conversely, if controller 210 does not indicate that the target center frequency is an overlapping center frequency (i.e. that the target center frequency is only eligible for one of TDD or FDD deployment), physical layer processing circuit 208 may perform conventional cell search (i.e. using a priori information of the duplex mode of the target center frequency as only one duplex mode is possible).

Accordingly, following triggering of the duplex mode detection procedure for a given target frequency, physical layer processing circuit 208 may first capture a search probe, i.e. a 5 ms block of signal data, at buffer 502 in 602 from the target center frequency. Accordingly, buffer 502 may receive signal data for the search probe from RF transceiver 204 which RF transceiver 204 has received on the target center frequency. Buffer 502 may then store the signal data for the search probe for later access by PSS detection circuit 504 and SSS detection circuit 506. The signal data may be time-domain baseband IQ samples provided by RF transceiver 204.

As previously indicated, each LTE cell may transmit a PSS-SSS sequence pair according to a fixed 5 ms period; accordingly, each 5 ms search probe may contain PSS-SSS sequence pairs from proximate cells to mobile terminal 102. Physical layer processing circuit 208 may then need to process the captured search probe in order to detect the presence of any detectable cells within the captured search probe. As more than one cell may be detectable, the captured search probe may contain PSS-SSS sequence pairs from more than one cell.

PSS detection circuit 504 may then process the search probe stored in buffer 502 in 604 in order to perform PSS detection on the captured search probe in order to detect PSS sequences transmitted by nearby cells. As previously introduced, each LTE cell may transmit a PSS sequence selected from a predefined set of PSS sequences (e.g. of set size 3), where each of the predefined PSS sequences is a Zadoff-Chu sequence that may be uniquely identified according to the physical-layer identity $N_{ID}^{(2)}$ (where $N_{ID}^{(2)} \in (0,1,2)$ as specified by the 3GPP). As each PSS sequence is predefined (where each physical-layer identity $N_{ID}^{(2)}$ specifies a different root for the Zadoff-Chu sequence), PSS detection circuit 504 may detect PSS sequences in the captured search probe by comparing local copies (either locally stored or locally generated) of the predefined PSS sequences to the captured search probe.

More specifically, in 604 PSS detection circuit 504 may perform a time-domain cross-correlation between the signal data of the captured search probe and each of the three predefined PSS sequences to obtain a cross-correlation function for each of the three predefined PSS sequences. Due to perfect autocorrelation properties of Zadoff-Chu sequences, each of the cross-correlation functions may have peaks (local maxima) at time samples that contain the start of a matching PSS sequence; accordingly, PSS detection circuit 504 may identify timing locations within the captured search probe that contain the start of a detected PSS sequence by identifying the peaks in each cross-correlation function. Each of the PSS peaks may correspond to a candidate cell, which may either be a real cell or a false ('ghost') cell. After identifying each of the PSS peaks for each of the cross-correlation functions (where each cross-correlation function corresponds to a different PSS sequence index $N_{ID}^{(2)}$), PSS detection circuit 504 may provide the PSS peaks to SSS detection circuit 506 for further evaluation. PSS detection circuit 504 may provide one or more PSS peaks to SSS detection circuit 506 for evaluation, such as e.g. a predefined quantity of PSS peaks that have the highest-valued cross-correlation amplitudes or all PSS peaks with cross-correlation amplitudes that exceed a predefined threshold. Each of the PSS peaks may correspond to a candidate cell, where the timing location of each PSS peak indicates the PSS transmission time of a respective candidate cell and the PSS sequence index matching with each PSS peak (e.g. which of the predefined PSS sequences the cross-correlation peak was produced for) indicates the PSS sequence index of the respective candidate cell. PSS detection circuit 504 may thus provide SSS detection circuit 506 with the timing location and PSS sequence index of each detected PSS peak.

Physical layer processing circuit 208 may additionally need to identify the SSS sequence index of each candidate cell (i.e. matching with each PSS peak) detected by PSS detection circuit 504 for the target center frequency. As previously detailed regarding FIGS. 3 and 4, FDD cells may transmit SSS sequences in the symbol immediately preceding PSS sequence while TDD cells may transmit SSS sequences three symbols prior to the PSS sequence (where each center frequency exclusively contains either FDD cells or TDD cells). Accordingly, if the symbols immediately preceding the detected PSS peaks contain SSS sequences, physical layer processing circuit 208 may determine that the target center frequency is an FDD cell. Conversely, if the symbols occurring three symbols prior to the detected PSS peaks contain SSS sequences, physical layer processing circuit 208 may determine that the target center frequency is a TDD cell.

SSS detection circuit 506 may therefore evaluate both possible SSS sequence locations in 606 and 608. As shown in FIG. 6, SSS detection circuit 506 may perform SSS detection using an FDD hypothesis in 606, i.e. by evaluating whether the symbols immediately preceding the detected PSS peaks contain SSS sequences, while performing SSS detection using a TDD hypothesis in 606, i.e. by evaluating whether the symbols occurring three symbols before the detected PSS peaks contain SSS sequences. SSS detection circuit 506 may perform 606 in parallel or sequentially in any order.

Accordingly, SSS detection circuit 506 may perform SSS detection using two hypotheses: an FDD hypothesis in which the SSS sequence immediately precedes the PSS sequence and a TDD hypothesis in which the SSS sequence occurs three symbols prior to the PSS sequence. Accordingly, SSS detection circuit 506 may attempt SSS detection both using the FDD hypothesis (i.e. by evaluating the symbol immediately preceding the detected PSS peaks) and using the TDD hypothesis (i.e. by evaluating the symbol occurring three symbols prior to the detected PSS peaks). Decision circuit 508 may then evaluate the results of both hypotheses in order to determine which of the FDD or the TDD hypothesis is correct. In doing so, physical layer processing circuit 208 may both identify the SSS sequence index ($N_{ID}^{(1)}$) of the PSS-SSS sequence pair corresponding to each detected PSS sequence and determine the correct duplex mode of the target center frequency.

As previously introduced, each LTE cell may transmit an SSS sequence selected from a predefined set of SSS sequences. Each of the predefined SSS sequences may be a pseudo-random noise sequence that may be uniquely identified according to the physical-layer cell-identity group $N_{ID}^{(1)}$ (where $N_{ID}^{(1)} \in \{0, 1, \ldots, 167\}$ as specified by the 3GPP). Accordingly, in order to evaluate the FDD SSS hypothesis in 606, SSS detection circuit 506 may compare each of the symbols immediately preceding the detected PSS peaks with each of the predefined SSS sequences in order to identify which predefined SSS sequence provides the strongest 'match' for the FDD hypothesis of each detected PSS peak. SSS detection circuit 506 may similarly compare each of the symbols occurring three symbols prior to the detected PSS peaks with each of the predefined SSS sequences in order to identify which predefined SSS sequence provides the strongest 'match' for the TDD hypothesis of each detected PSS peak.

Accordingly, each PSS peak provided by PSS detection circuit 504 may provide two candidate SSS sequences: an FDD candidate SSS sequence located in the symbol immediately preceding the PSS peak and a TDD candidate SSS sequence located in the symbol occurring three symbols prior to the PSS peak. In order to evaluate the FDD and TDD candidate SSS sequences in 606 and 608, SSS detection circuit 506 may 'extract' the FDD and TDD candidate SSS sequences from the signal data of the captured search probe by retrieving signal data for the FDD and TDD candidate SSS sequences relative to the PSS peak timing locations within the captured search probe. Accordingly, SSS detection circuit 506 may obtain an FDD candidate SSS sequence and a TDD candidate SSS sequence for each detected PSS peak.

SSS detection circuit 506 may then compare each FDD candidate SSS sequence and each TDD candidate SSS sequences to the predefined set of SSS sequences in 606 and 608, respectively, in order to identify which predefined SSS sequence provides the strongest match with each FDD and TDD candidate SSS sequence. Accordingly, similarly as to PSS detection circuit 504 in 604, SSS detection circuit 506 may calculate the cross-correlation between each of the FDD and TDD candidate SSS sequences and each of the predefined SSS sequences to identify which predefined SSS sequence produces the strongest match, i.e. which predefined SSS sequence produces the highest cross-correlation metric. In contrast to PSS detection in which an entire 5 ms search probe must be 'searched' with a sliding correlation to identify PSS timing locations, in SSS detection the SSS timing locations may already be known as the PSS peaks provide a timing reference point to identify SSS timing locations. Accordingly, SSS detection circuit 506 may not need to perform a full sliding correlation in 606 and 608 to compare the FDD and TDD candidate SSS sequences to the predefined SSS sequences.

Furthermore, as the symbol positioning is known, SSS detection circuit 506 may perform the SSS detection correlation in the frequency domain by applying a Fast Fourier Transform (FFT) to each FDD and TDD candidate SSS sequence extracted from the captured search probe (using the PSS peak timing locations as a reference point to place the FFT window) to obtain a frequency-domain candidate SSS sequence for each FDD and TDD candidate SSS sequence. SSS detection circuit 506 may then perform a cross-correlation with each of the frequency-domain FDD and TDD candidate SSS sequences and frequency-domain representations of each of the predefined SSS sequences to identify which predefined SSS sequence produces the strongest match with each of the FDD and TDD candidate SSS sequences, i.e. the predefined SSS sequence that produces the highest magnitude cross-correlation metric. Such methods of cross-correlation are established; for example, SSS detection circuit 506 may calculate the complex conjugate of each predefined SSS sequence and, in calculating the cross-correlation between a given frequency-domain FDD or TDD candidate SSS sequence and a predefined SSS sequence, may calculate the absolute value of the dot-product (i.e. calculate the element-wise product vector and sum the elements) of the frequency-domain FDD or TDD candidate SSS sequence and the complex conjugate of the predefined SSS sequence. SSS detection circuit 506 may then evaluate the cross-correlation metrics to identify which predefined SSS sequences yields the highest cross-correlation metric and take the identified predefined SSS sequence as the matching SSS sequence.

SSS detection circuit 506 may optionally utilize additional techniques in 606 and 608 to perform SSS detection on the FDD and TDD candidate SSS sequences. In a first optional addition, SSS detection circuit 506 may employ coherent detection in order to correct for channel variations. For example, for a given PSS peak, SSS detection circuit 506 may utilize the PSS peak in order to place an FFT window to capture the PSS sequence symbol and subsequently obtain a frequency-domain representation of the received PSS sequence. SSS detection circuit 506 may then compare the received PSS sequence to the matching predefined PSS sequence (i.e. the predefined PSS sequence corresponding to the cross-correlation function that produced the PSS peak) in order to derive an estimate of the channel at each subcarrier of the received PSS sequence (i.e. the central 62 subcarriers excluding the DC subcarrier). SSS detection circuit 506 may then utilize the channel estimates (which may be channel samples at each subcarrier) to 'correct' the FDD and TDD candidate SSS sequences in order to resolve channel variations. SSS detection circuit 506 may then calculate the cross-correlation between the FDD and TDD candidate SSS sequences and the predefined SSS sequences using the channel-corrected FDD and TDD candidate SSS sequences, which may improve detection results by removing channel error.

In a second optional addition, SSS detection circuit 506 may perform ghost cell-filtering on the PSS peaks provided by PSS detection circuit 504. As previously indicated, the PSS cell peaks may correspond to 'candidate' cells that may either be actual or false ('ghost') cells. Accordingly, there may not be a benefit to performing 606-608 on any PSS peaks of ghost cells, as such ghost cells may not be valid. SSS detection circuit 506 may therefore perform ghost cell filtering on the PSS peaks in order to eliminate any unnecessary processing. For example, SSS detection circuit 506 may perform ghost cell filtering based on the channel estimates obtained in the first optional addition introduced above. More specifically, SSS detection circuit 506 may utilize the channel samples obtained via comparison of the received PSS sequences and the predefined PSS sequences to determine whether the channel is acceptable or not. For example, if the channel samples for a given PSS peak indicate excessive noise, such as e.g. a Signal-to-Noise Ratio (SNR) that exceeds a threshold, SSS detection circuit 506 may determine that the PSS peak is likely attribute to a ghost cell and may discard the PSS peak from consideration.

Accordingly, in 606 and 608 SSS detection circuit 506 may obtain a cross-correlation metric between each of the FDD and TDD candidate SSS sequences and each of the predefined SSS sequences, where each cross-correlation metric indicates the match strength between a respective FDD or TDD candidate SSS sequence and a predefined SSS sequence. SSS detection circuit 506 may thus identify the predefined SSS sequence that is the best match for each FDD and TDD candidate SSS sequence, may identify the predefined SSS sequences that produces the highest cross-correlation metric with a given FDD or TDD candidate SSS sequence as the matching SSS sequence, where the cross-correlation metric for each matching SSS sequence indicates the strength of the match.

As only one of the FDD or the TDD hypothesis can be correct, either the FDD candidate SSS sequences or the TDD candidate SSS sequences should produce strong matches, i.e. high cross-correlation metrics, with the corresponding matching SSS sequences while the other of the FDD candidate SSS sequences or the TDD candidate SSS sequences should produce weak matches. For example, if the target center frequency is FDD and SSS detection circuit 506 performs SSS detection on a single PSS peak to obtain an FDD candidate SSS sequence and a TDD candidate SSS sequence in 606 and 608, the FDD candidate SSS sequence should produce a high cross-correlation metric with one of the predefined SSS sequences (i.e. the matching SSS sequence) while the TDD candidate SSS sequence should produce relatively low cross-correlation metrics (indicative of non-correlation) with all of the predefined SSS sequences (and vice versa if the target center frequency is TDD). Such should hold for the FDD and TDD candidate SSS sequences of each of the PSS peaks, although variations may exist due to radio phenomena that may degrade the correlation.

SSS detection circuit 506 may thus provide the cross-correlation metrics for each of the FDD and TDD candidate SSS sequences (one FDD-TDD candidate SSS sequence pair per PSS peak) to decision circuit 508, which may proceed to evaluate the FDD and TDD hypothesis results in 610 to detect the duplex mode of the target center frequency. Decision circuit 508 may thus aim to determine whether the FDD candidate SSS sequences or the TDD candidate SSS sequences yield the higher cross-correlation metrics, i.e. which of the TDD or the FDD candidate SSS sequence has a higher cross-correlation metric with the matching predefined SSS sequence. As only one hypothesis is correct, either the FDD candidate SSS sequences or the TDD candidate SSS sequences should produce high correlation with the predefined SSS sequences while the other should be relatively uncorrelated with the predefined SSS sequences (as no SSS sequences are actually present at the hypothesis SSS timing location relative to the PSS peaks).

Decision circuit 508 may employ any of a number of various comparison schemes to compare the cross-correlation metrics of the FDD and TDD candidate SSS sequences. For example, if only one PSS peak is being evaluated, decision circuit 508 may simply identify which of the FDD or the TDD candidate SSS sequence produces the higher cross-correlation metric (with the corresponding matching SSS sequence of the set of predefined SSS sequences) and determine that the duplex mode matches with the correct hypothesis, i.e. identify the duplex mode as FDD if the FDD candidate SSS sequence produces a higher cross-correlation metric than the TDD candidate SSS sequence and vice versa if the TDD candidate SSS sequence produces a higher cross-correlation metric than the FDD candidate SSS sequence.

Alternatively, if more than one PSS peak is being evaluated, decision circuit 508 may receive FDD and TDD candidate SSS sequence cross-correlation metrics for each of the PSS peaks. Decision circuit 508 may therefore perform a collective evaluation, such as by calculating the average of the FDD candidate SSS sequence cross-correlation metrics and the average of the TDD candidate SSS sequence cross-correlation metrics and similarly identifying the duplex mode based on which of the average of the FDD candidate SSS sequence cross-correlation metrics and the average of the TDD candidate SSS sequence cross-correlation metrics is greater.

Accordingly, decision circuit 508 may determine the duplex mode of the target center frequency in 610 based on the cross-correlation metrics for the FDD and TDD candidate SSS sequences of the detected PSS peaks. By directly evaluating each hypothesis SSS timing location relative to the PSS peaks during cell search, physical layer processing circuit 208 may avoid having to perform duplicate cell scans in order to detect duplex mode. Such may conserve battery power and reduce scan completion time.

Decision circuit 508 may additionally perform post-processing in 612 using the PSS and SSS detection results. As previously detailed, by identifying a PSS sequence index and an SSS sequence index for each PSS peak (where the SSS sequence index is given by the matching SSS sequence of the correct duplex mode hypothesis), physical layer processing circuit 208 may identify the PSS-SSS sequence index of each detected cell on the target center frequency and thus identify the PCI of each detected cell. Furthermore, the timing locations of the PSS peaks and SSS sequences may provide the full time synchronization information required for mobile terminal 102 to synchronize communications with each detected cell. Accordingly, decision circuit 508 may aggregate the PSS and SSS detection results at 612, which may represent the cell search results for the target center frequency.

Decision circuit 508 may additionally perform ghost cell filtering during the post-processing of 612. As previously indicated, each PSS peak may correspond to a 'candidate cell'; however, some of these candidate cells may be false or 'ghost' cells that inadvertently produce matches with the predefined PSS and SSS sequences via noise and interference. Accordingly, decision circuit 508 may perform further processing suing the PSS and SSS detection results in order to identify ghost cells from the detected candidate cells. Accordingly, decision circuit 508 may aggregate detection results such as PSS peak timing locations, PSS cross-correlation functions, candidate SSS sequences, candidate SSS sequence cross-correlation metrics, etc., and evaluate these detection results in order to filter out ghost cells.

PSS detection circuit 504 and SSS detection circuit 506 may additionally utilize accumulation techniques in order to aggregate signal data across multiple captured search probes, which may assist in countering noise and other random radio effects. For example, as opposed to capturing a single 5 ms search probe in buffer 502 for subsequent evaluation by PSS detection circuit 504, physical layer processing circuit 208 may instead capture a first search probe and perform PSS detection on the first search probe at PSS detection circuit 504 to obtain the cross-correlation function for each predefined PSS sequence. Physical layer processing circuit 208 may then store the cross-correlation functions for the first search probe (e.g. in a temporary memory) and proceed to capture and process a second search probe at buffer 502 and PSS detection circuit 504 to obtain cross-correlation functions for the second search probe. PSS detection circuit 504 may then average together (e.g. after calculating the absolute value) or add the cross-correlation functions for the first and second search probes in order to obtain accumulated cross-correlation functions, which may be more resilient to noise and random channel effects. PSS detection circuit 504 may then identify the PSS peaks for later analysis by SSS detection circuit 506 using the accumulated cross-correlation functions. Likewise, SSS detection circuit 506 may accumulate or average multiple TDD and FDD candidate SSS sequences for a given PSS peak over multiple search probes (where PSS peaks are assumed to retain a similar timing location over several search probes) in order to obtain TDD and FDD candidate SSS sequences that are more robust to noise and thus may produce more accurate TDD and FDD candidate SSS sequence cross-correlation results. Additionally or alternatively, SSS detection circuit 506 may average together TDD and FDD candidate SSS sequence cross-correlation results for each PSS peak over multiple half-frames. Similar such variations are within the scope of this disclosure.

Mobile terminal 102 may repeat method 600 for each of a plurality of target center frequencies in order to detect cells on each of the plurality of target center frequencies. Depending on the use context, mobile terminal 102 may then transmit or receive data based on the detected cells, which may include receiving further information (such as SIBs) from one or more of the detected cells, performing further radio measurements on one or more of the detected cells, establishing a radio connection with one or more of the detected cells, etc. By performing duplex mode detection during a single cell scan of each target center frequency, mobile terminal 102 may reduce power consumption and cell scan latency.

While the above description has focused on an LTE context, the implementations detailed herein are demonstrative and may be analogously applied to other radio communication contexts, in particular where cells of differing duplexing modes transmit synchronization sequences that are separated according to a predefined symbol spacing pattern.

Figure 7:
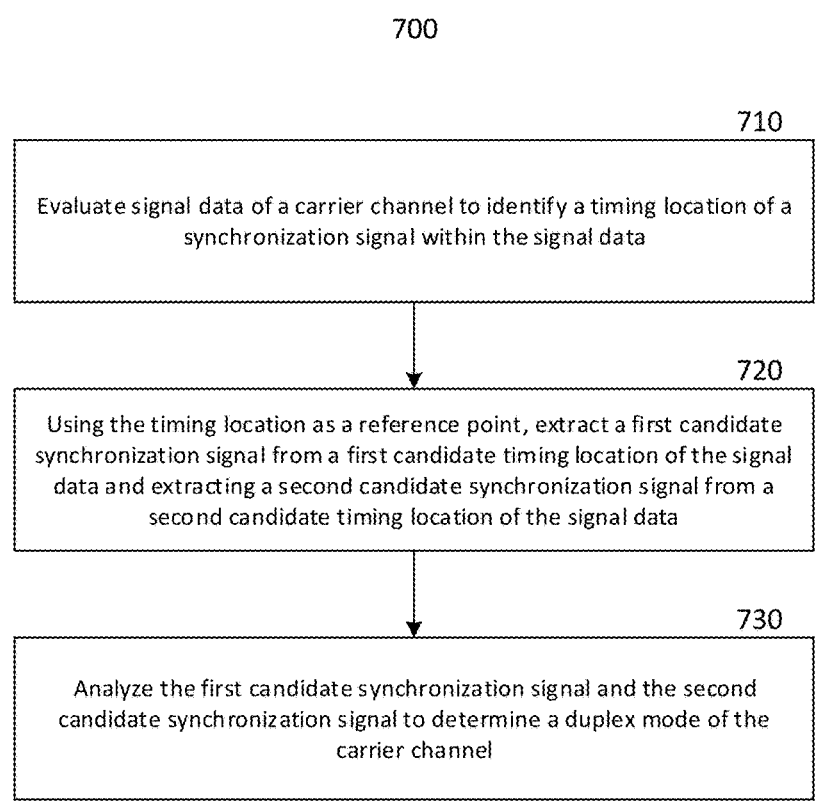
FIG. 7 shows a first method of performing radio scans.

FIG. 7 shows method 700 of performing a radio scan. As shown in FIG. 7, method 700 includes evaluating signal data of a carrier channel to identify a timing location of a synchronization signal within the signal data (710), using the timing location as a reference point, extracting a first candidate synchronization signal from a first candidate timing location of the signal data and extracting a second candidate synchronization signal from a second candidate timing location of the signal data (720), and analyzing the first candidate synchronization signal and the second candidate synchronization signal to determine a duplex mode of the carrier channel (730).

Figure 8:
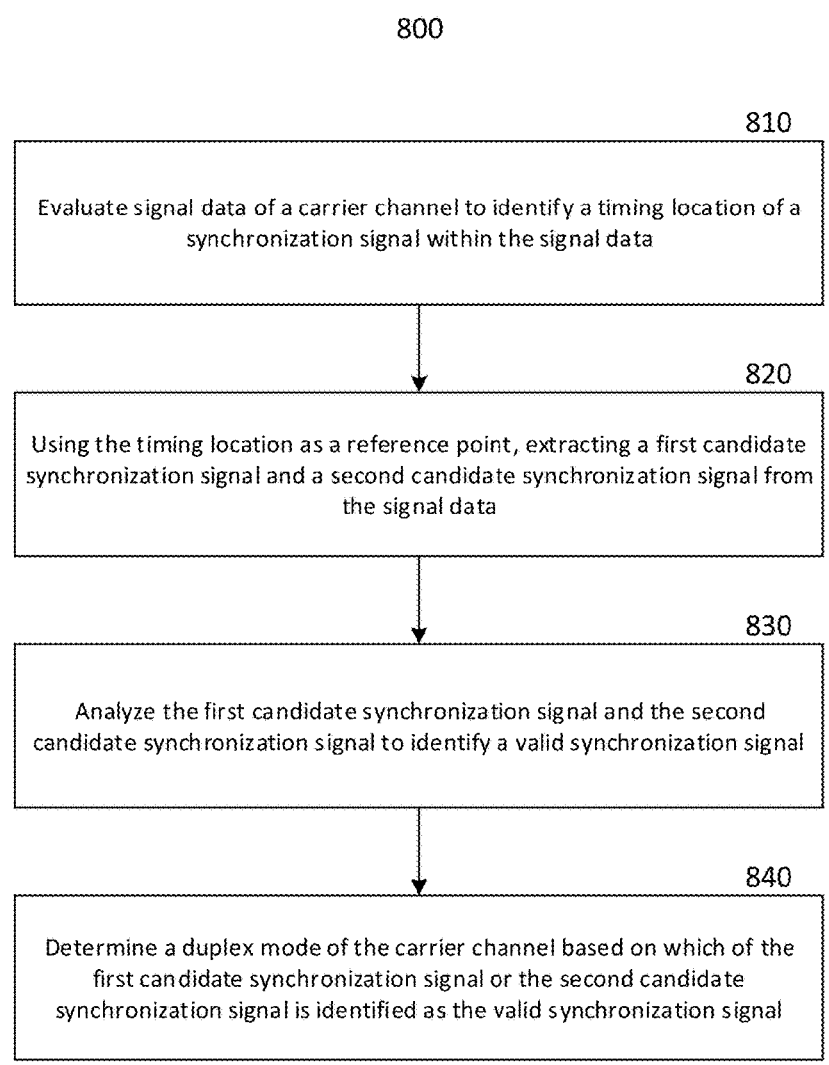
FIG. 8 shows a second method of performing radio scans.

FIG. 8 shows method 800 of performing a radio scan. As shown in FIG. 8, method 800 includes evaluating signal data of a carrier channel to identify a timing location of a synchronization signal within the signal data (810), using the timing location as a reference point, extracting a first candidate synchronization signal and a second candidate synchronization signal from the signal data (820), analyzing the first candidate synchronization signal and the second candidate synchronization signal to identify a valid synchronization signal (830), and determining a duplex mode of the carrier channel based on which of the first candidate synchronization signal or the second candidate synchronization signal is identified as the valid synchronization signal (840).

In one or more further exemplary aspects of the disclosure, one or more of the features described above in reference to FIGS. 1-6 may be further incorporated into method 700 and/or 800. In particular, method 700 and/or 800 may be configured to perform further and/or alternate processes as detailed regarding mobile terminal 102 and/or physical processing circuit 208.

The following examples pertain to further aspects of this disclosure:

Example 1 is a method of performing a radio scan, the method including evaluating signal data of a carrier channel to identify a timing location of a synchronization signal within the signal data, using the timing location as a reference point, extracting a first candidate synchronization signal from a first candidate timing location of the signal data and extracting a second candidate synchronization signal from a second candidate timing location of the signal data, and analyzing the first candidate synchronization signal and the second candidate synchronization signal to determine a duplex mode of the carrier channel.

In Example 2, the subject matter of Example 1 can optionally include wherein the first candidate timing location corresponds to a frequency division duplex (FDD) mode and the second candidate timing location corresponds to a time division duplex (TDD) mode.

In Example 3, the subject matter of Example 2 can optionally include wherein analyzing the first candidate synchronization signal and the second candidate synchronization signal to determine the duplex mode of the carrier channel includes determining which of the first candidate synchronization signal or the second candidate synchronization signal has a higher correlation with one or more predefined synchronization signals, and determining the duplex mode as FDD if the first candidate synchronization signal produces the higher correlation and determining the duplex mode as TDD if the second candidate synchronization signal produces the higher correlation.

In Example 4, the subject matter of Example 3 can optionally include wherein determining which of the first candidate synchronization signal or the second candidate synchronization signal has the higher correlation with the one or more predefined synchronization signals includes comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal, identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric, and identifying which of the first correlation metric or the second correlation metric is higher to determine which of the first candidate synchronization signal or the second candidate synchronization signal has the higher correlation with the plurality of predefined synchronization signals.

In Example 5, the subject matter of any one of Examples 1 to 3 can optionally include wherein the first candidate timing location is separated from the timing location by a different number of symbol periods than the second candidate timing location.

In Example 6, the subject matter of Example 5 can optionally include wherein the number of symbol periods separating the first candidate timing location from the second candidate timing location is predefined.

In Example 7, the subject matter of Example 1 can optionally include wherein evaluating the signal data of the carrier channel to identify the timing location of the synchronization signal within the signal data includes comparing the signal data to a plurality of predefined synchronization signals to identify the timing location as the location of one of the plurality of predefined synchronization signals in the signal data.

In Example 8, the subject matter of Example 7 can optionally include wherein the plurality of predefined synchronization signals are Primary Synchronization Signals (PSSs).

In Example 9, the subject matter of Example 7 can optionally include wherein comparing the signal data to the plurality of predefined synchronization signals to identify the timing location as the location of one of the plurality of predefined synchronization signals in the signal data includes calculating the cross-correlation between the signal data and each of the plurality of predefined synchronization signals to obtain a plurality of cross-correlations, and identifying the timing location as a peak value of one of the plurality of cross-correlations.

In Example 10, the subject matter of Example 1 can optionally include wherein analyzing the first candidate synchronization signal and the second candidate synchronization signal to determine the duplex mode of the carrier channel includes comparing the first candidate synchronization signal and the second candidate synchronization signal to a plurality of predefined synchronization signals to obtain a correlation metric for the first candidate synchronization signal and a correlation metric for the second candidate synchronization signal, and comparing the correlation metric for the first candidate synchronization signal to the correlation metric for the second candidate synchronization signal to determine the duplex mode.

In Example 11, the subject matter of Example 10 can optionally include wherein comparing the correlation metric for the first candidate synchronization signal to correlation metric for the second candidate synchronization signal to determine the duplex mode includes identifying which of the correlation metric for the first candidate synchronization signal or the correlation metric for the second candidate synchronization signal has a higher magnitude.

In Example 12, the subject matter of Example 1 can optionally include wherein analyzing the first candidate synchronization signal and the second candidate synchronization signal to determine the duplex mode of the carrier channel includes comparing a correlation metric for the first candidate synchronization signal to a correlation metric for the second candidate synchronization signal, and selecting the duplex mode based on the comparison.

In Example 13, the subject matter of any one of Examples 1 to 12 can optionally include wherein the synchronization signal is a candidate Primary Synchronization Signal (PSS) and the first candidate synchronization signal and the second candidate synchronization signal are candidate Secondary Synchronization Signals (SSSs).

In Example 14, the subject matter of any one of Examples 1 to 13 can optionally include wherein evaluating the signal data of the carrier channel to identify the timing location of the synchronization signal within the signal data includes performing PSS detection on the signal data, and wherein extracting the first candidate synchronization signal from the first candidate timing location of the signal data and extracting the second candidate synchronization signal from the second candidate timing location of the signal data includes performing SSS detection.

In Example 15, the subject matter of Example 14 can optionally further include aggregating PSS detection results and SSS detection results to obtain cell scan results for the carrier channel, and performing radio communications based on the cell scan results.

In Example 16, the subject matter of any one of Examples 1 to 15 can optionally further include performing channel estimation with the synchronization signal to obtain a channel estimate, and performing channel correction on the first candidate synchronization signal or the second candidate synchronization signal with the channel estimate.

In Example 17, the subject matter of Example 16 can optionally further include performing ghost cell detection with the channel estimate.

In Example 18, the subject matter of any one of Examples 1 to 17 can optionally further include evaluating the signal data to identify one or more additional timing locations of one or more additional synchronization signals within the signal data, extracting one or more additional candidate synchronization signals from candidate timing locations relative using the one or more further additional locations as reference points, wherein analyzing the first candidate synchronization signal and the second candidate synchronization signal to determine the duplex mode of the carrier channel includes analyzing the first candidate synchronization signal, the second candidate synchronization signal, and the one or more additional synchronization signals to determine the duplex mode of the carrier channel.

In Example 19, the subject matter of any one of Examples 1 to 18 can optionally include wherein the carrier channel is a Long Term Evolution (LTE) carrier channel.

In Example 20, the subject matter of any one of Examples 1 to 19 can optionally further include wirelessly receiving the signal data on the carrier channel.

Example 21 is a circuit arrangement configured to perform the method of any one of Examples 1 to 20.

Example 22 is a radio communication device configured to perform the method of any one of Examples 1 to 20.

Example 23 is a baseband modem configured to perform the method of any one of Examples 1 to 20.

Example 24 is a method of performing a radio scan, the method including evaluating signal data of a carrier channel to identify a timing location of a synchronization signal within the signal data, using the timing location as a reference point, extracting a first candidate synchronization signal and a second candidate synchronization signal from the signal data, analyzing the first candidate synchronization signal and the second candidate synchronization signal to identify a valid synchronization signal, and determining a duplex mode of the carrier channel based on which of the first candidate synchronization signal or the second candidate synchronization signal is identified as the valid synchronization signal.

In Example 25, the subject matter of Example 24 can optionally include wherein extracting the first candidate synchronization signal and the second candidate synchronization signal from the signal data includes extracting the first candidate synchronization signal from a first candidate timing location of the signal data and extracting the second candidate synchronization signal from a second candidate timing location of the signal data.

In Example 26, the subject matter of Example 25 can optionally include wherein the first candidate timing location is separated from the timing location by a first predefined symbol separation and the second candidate timing location is separated from the timing location by a second predefined symbol separation.

In Example 27, the subject matter of any one of Examples 24 to 26 can optionally include wherein the first candidate synchronization signal corresponds to a synchronization signal location for a frequency division duplexing (FDD) schedule and the second candidate synchronization signal corresponds to a synchronization signal location for a time division duplexing (TDD) schedule.

In Example 28, the subject matter of Example 27 can optionally include wherein determining the duplex mode of the carrier channel based on which of the first candidate synchronization signal or the second candidate synchronization signal is identified as the valid synchronization signal includes identifying the duplex mode as FDD if the first candidate synchronization signal is identified as the valid synchronization signal and identifying the duplex mode as TDD if the second candidate synchronization signal is identified as the valid synchronization signal.

In Example 29, the subject matter of Example 27 can optionally include wherein analyzing the first candidate synchronization signal and the second candidate synchronization signal to identify the valid synchronization signal includes determining which of the first candidate synchronization signal or the second candidate synchronization signal has a higher correlation with one or more predefined synchronization signals, and identifying the valid synchronization signal based on which has the higher correlation.

In Example 30, the subject matter of Example 29 can optionally include wherein determining which of the first candidate synchronization signal or the second candidate synchronization signal has the higher correlation with the one or more predefined synchronization signals includes comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal, identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric, and identifying which of the first correlation metric or the second correlation metric has higher amplitude to determine which of the first candidate synchronization signal or the second candidate synchronization signal has the higher correlation with the plurality of predefined synchronization signals.

In Example 31, the subject matter of any one of Examples 24 to 26 can optionally include wherein evaluating the signal data of the carrier channel to identify the timing location of the synchronization signal within the signal data includes comparing the signal data to a plurality of predefined synchronization signals to identify the timing location as the location of one of the plurality of predefined synchronization signals in the signal data.

In Example 32, the subject matter of Example 31 can optionally include wherein the plurality of predefined synchronization signals are Primary Synchronization Signals (PSSs).

In Example 33, the subject matter of Example 31 can optionally include wherein comparing the signal data to the plurality of predefined synchronization signals to identify the timing location as the location of one of the plurality of predefined synchronization signals in the signal data includes calculating the cross-correlation between the signal data and each of the plurality of predefined synchronization signals to obtain a plurality of cross-correlations, and identifying the timing location as a peak value of one of the plurality of cross-correlations.

In Example 34, the subject matter of any one of Examples 24 to 26 can optionally include wherein analyzing the first candidate synchronization signal and the second candidate synchronization signal to identify the valid synchronization signal includes comparing the first candidate synchronization signal and the second candidate synchronization signal to a plurality of predefined synchronization signals to obtain a correlation metric for the first candidate synchronization signal and a correlation metric for the second candidate synchronization signal, and comparing the correlation metric for the first candidate synchronization signal to the correlation metric for the second candidate synchronization signal to determine which of the first candidate synchronization signal or the second candidate synchronization signal is the valid synchronization signal.

In Example 35, the subject matter of Example 34 can optionally include wherein comparing the correlation metric for the first candidate synchronization signal to the correlation metric for the second candidate synchronization signal to determine which of the first candidate synchronization signal or the second candidate synchronization signal is the valid synchronization signal includes identifying which of the correlation metric for the first candidate synchronization signal or the correlation metric for the second candidate synchronization signal has a higher magnitude.

In Example 36, the subject matter of any one of Examples 24 to 26 can optionally include wherein analyzing the first candidate synchronization signal and the second candidate synchronization signal to identify the valid synchronization signal includes comparing a correlation metric for the first candidate synchronization signal to a correlation metric for the second candidate synchronization signal to identify which of the first candidate synchronization signal or the second candidate synchronization signal has a higher correlation metric, identifying the first candidate synchronization signal as the valid synchronization signal if the first candidate synchronization signal has the higher correlation metric and identifying the second candidate synchronization signal as the valid synchronization signal if the second candidate synchronization signal has the higher correlation metric.

In Example 37, the subject matter of any one of Examples 24 to 36 can optionally include wherein the synchronization signal is a candidate Primary Synchronization Signal (PSS)

and the first candidate synchronization signal and the second candidate synchronization signal are candidate Synchronization Signals (SSSs).

In Example 38, the subject matter of any one of Examples 24 to 26 can optionally include wherein evaluating the signal data of the carrier channel to identify the timing location of the synchronization signal within the signal data includes performing PSS detection on the signal data, and wherein extracting the first candidate synchronization signal from the first candidate timing location of the signal data and extracting the second candidate synchronization signal from the second candidate timing location of the signal data includes performing SSS detection.

In Example 39, the subject matter of Example 38 can optionally further include aggregating PSS detection results and SSS detection results to obtain cell scan results for the carrier channel, and performing radio communications based on the cell scan results.

In Example 40, the subject matter of any one of Examples 24 to 39 can optionally further include performing channel estimation with the synchronization signal to obtain a channel estimate, and performing channel correction on the first candidate synchronization signal or the second candidate synchronization signal with the channel estimate.

In Example 41, the subject matter of Example 40 can optionally further include performing ghost cell detection with the channel estimate.

In Example 42, the subject matter of any one of Examples 24 to 41 can optionally further include evaluating the signal data to identify one or more additional timing locations of one or more additional synchronization signals within the signal data, extracting one or more additional candidate synchronization signals from the signal data using the one or more additional timing locations as reference points, wherein analyzing the first candidate synchronization signal and the second candidate synchronization signal to identify the valid synchronization signal includes analyzing the first candidate synchronization signal, the second candidate synchronization signal, and the one or more additional synchronization signals to identify the valid synchronization signal.

In Example 43, the subject matter of any one of Examples 24 to 42 can optionally include wherein the carrier channel is a Long Term Evolution (LTE) carrier channel.

In Example 44, the subject matter of any one of Examples 24 to 43 can optionally further include wirelessly receiving the signal data on the carrier channel.

Example 45 is a processing circuit arrangement configured to perform the method of any one of Examples 24 to 44.

Example 46 is a radio communication device configured to perform the method of any one of Examples 24 to 44.

Example 47 is a baseband modem configured to perform the method of any one of Examples 24 to 44.

Example 48 is a circuit arrangement including a first detection circuit configured to evaluate signal data of a carrier channel to identify a timing location of a synchronization signal within the signal data, a second detection circuit configured to, using the timing location as a reference point, extract a first candidate synchronization signal from a first candidate timing location of the signal data and to extract a second candidate synchronization signal from a second candidate timing location of the signal data, and a decision circuit configured to analyze the first detection synchronization signal and the second candidate synchronization signal to determine a duplex mode of the carrier channel.

In Example 49, the subject matter of Example 48 can optionally further include a radio frequency (RF) transceiver and an antenna and configured as a radio communication device.

In Example 50, the subject matter of Example 49 can optionally include wherein the first detection circuit, the second detection circuit, and the decision circuit are contained in a baseband modem of the radio communication device.

In Example 51, the subject matter of any one of Examples 48 to 50 can optionally include wherein the first candidate timing location corresponds to a frequency division duplex (FDD) mode and the second candidate timing location corresponds to a time division duplex (TDD) mode.

In Example 52, the subject matter of Example 51 can optionally include wherein the decision circuit is configured to analyze the first detection synchronization signal and the second candidate synchronization signal to determine the duplex mode of the carrier channel by determining which of the first candidate synchronization signal or the second candidate synchronization signal has a higher correlation with one or more predefined synchronization signals, and determining the duplex mode as FDD if the first candidate synchronization signal produces the higher correlation and determining the duplex mode as TDD if the second candidate synchronization signal produces the higher correlation.

In Example 53, the subject matter of Example 52 can optionally include wherein the decision circuit is configured to determine which of the first candidate synchronization signal or the second candidate synchronization signal has the higher correlation with the one or more predefined synchronization signals by comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal, identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric, and identifying which of the first correlation metric or the second correlation metric is higher to determine which of the first candidate synchronization signal or the second candidate synchronization signal has the higher correlation with the plurality of predefined synchronization signals.

In Example 54, the subject matter of any one of Examples 48 to 53 can optionally include wherein the first candidate timing location is separated from the timing location by a different number of symbol periods than the second candidate timing location.

In Example 55, the subject matter of Example 54 can optionally include wherein the number of symbol periods separating the first candidate timing location from the second candidate timing location is predefined.

In Example 56, the subject matter of any one of Examples 48 to 50 can optionally include wherein the first detection circuit is configured to evaluate the signal data of the carrier channel to identify the timing location of the synchronization signal within the signal data by comparing the signal data to a plurality of predefined synchronization signals to identify the timing location as the location of one of the plurality of predefined synchronization signals in the signal data.

In Example 57, the subject matter of Example 56 can optionally include wherein the plurality of predefined synchronization signals are Primary Synchronization Signals (PSSs).

In Example 58, the subject matter of Example 56 can optionally include wherein the first detection circuit is configured to compare the signal data to the plurality of predefined synchronization signals to identify the timing location as the location of one of the plurality of predefined synchronization signals in the signal data by calculating the cross-correlation between the signal data and each of the plurality of predefined synchronization signals to obtain a plurality of cross-correlations, and identifying the timing location as a peak value of one of the plurality of cross-correlations.

In Example 59, the subject matter of any one of Examples 48 to 50 can optionally include wherein the decision circuit is configured to analyze the first candidate synchronization signal and the second candidate synchronization signal to determine the duplex mode of the carrier channel by comparing the first candidate synchronization signal and the second candidate synchronization signal to a plurality of predefined synchronization signals to obtain a correlation metric for the first candidate synchronization signal and a correlation metric for the second candidate synchronization signal, and comparing the correlation metric for the first candidate synchronization signal to the correlation metric for the second candidate synchronization signal to determine the duplex mode.

In Example 60, the subject matter of Example 59 can optionally include wherein the decision circuit is configured to compare the correlation metric for the first candidate synchronization signal to correlation metric for the second candidate synchronization signal to determine the duplex mode by identifying which of the correlation metric for the first candidate synchronization signal or the correlation metric for the second candidate synchronization signal has a higher magnitude.

In Example 61, the subject matter of any one of Examples 48 to 50 can optionally include wherein the decision circuit is configured to analyze the first candidate synchronization signal and the second candidate synchronization signal to determine the duplex mode of the carrier channel by comparing a correlation metric for the first candidate synchronization signal to a correlation metric for the second candidate synchronization signal, and selecting the duplex mode based on the comparison.

In Example 62, the subject matter of any one of Examples 48 to 61 can optionally include wherein the synchronization signal is a candidate Primary Synchronization Signal (PSS) and the first candidate synchronization signal and the second candidate synchronization signal are candidate Secondary Synchronization Signals (SSSs).

In Example 63, the subject matter of any one of Examples 48 to 50 can optionally include wherein the first detection circuit is configured to evaluate the signal data of the carrier channel to identify the timing location of the synchronization signal within the signal data by performing PSS detection on the signal data, and wherein the second detection circuit is configured to extract the first candidate synchronization signal from the first candidate timing location of the signal data and extract the second candidate synchronization signal from the second candidate timing location of the signal data by performing SSS detection.

In Example 64, the subject matter of Example 63 can optionally include wherein the decision circuit is further configured to aggregating PSS detection results and SSS detection results to obtain cell scan results for the carrier channel, the circuit arrangement further including radio communication circuitry configured to perform radio communications based on the cell scan results.

In Example 65, the subject matter of any one of Examples 48 to 64 can optionally include wherein the second detection circuit is further configured to perform channel estimation with the synchronization signal to obtain a channel estimate, and perform channel correction on the first candidate synchronization signal or the second candidate synchronization signal with the channel estimate.

In Example 66, the subject matter of Example 65 can optionally include wherein the second detection circuit is further configured to perform ghost cell detection with the channel estimate.

In Example 67, the subject matter of any one of Examples 48 to 66 can optionally include wherein the first detection circuit is further configured to evaluate the signal data to identify one or more additional timing locations of one or more additional synchronization signals within the signal data, and the second detection circuit is further configured to extract one or more additional candidate synchronization signals from candidate timing locations relative using the one or more further additional locations as reference points, and wherein the decision circuit is configured to analyze the first candidate synchronization signal and the second candidate synchronization signal to determine the duplex mode of the carrier channel by analyzing the first candidate synchronization signal, the second candidate synchronization signal, and the one or more additional synchronization signals to determine the duplex mode of the carrier channel.

In Example 68, the subject matter of any one of Examples 48 to 67 can optionally include wherein the carrier channel is a Long Term Evolution (LTE) carrier channel.

In Example 69, the subject matter of Example Example can optionally include, further including radio communication circuitry configured to wirelessly receive the signal data on the carrier channel.

Example 70 is a circuit arrangement including a first detection circuit configured to evaluate signal data of a carrier channel to identify a timing location of a synchronization signal within the signal data, a second detection circuit configured to, using the timing location as a reference point, extract a first candidate synchronization signal and a second candidate synchronization signal from the signal data, and a decision circuit configured to analyze the first candidate synchronization signal and the second candidate synchronization signal to identify which of the first candidate synchronization signal or the second candidate synchronization signal is a valid synchronization signal, and further configured to determine a duplex mode of the carrier channel based on which of the first candidate synchronization signal or the second candidate synchronization signal is identified as the valid synchronization signal.

In Example 71, the subject matter of Example 70 can optionally further include a radio frequency (RF) transceiver and an antenna and configured as a radio communication device.

In Example 72, the subject matter of Example 71 can optionally include wherein the first detection circuit, the second detection circuit, and the decision circuit are contained in a baseband modem of the radio communication device.

In Example 73, the subject matter of any one of Examples 70 to 72 can optionally include wherein the second detection circuit is configured to extract the first candidate synchronization signal and the second candidate synchronization signal from the signal data by extracting the first candidate synchronization signal from a first candidate timing location of the signal data and extracting the second candidate synchronization signal from a second candidate timing location of the signal data.

In Example 74, the subject matter of Example 73 can optionally include wherein the first candidate timing location is separated from the timing location by a first predefined symbol separation and the second candidate timing location is separated from the timing location by a second predefined symbol separation.

In Example 75, the subject matter of Example 73 can optionally include wherein the first candidate synchronization signal corresponds to a synchronization signal location for a frequency division duplexing (FDD) schedule and the second candidate synchronization signal corresponds to a synchronization signal location for a time division duplexing (TDD) schedule.

In Example 76, the subject matter of Example 75 can optionally include wherein the decision circuit is configured to determine the duplex mode of the carrier channel based on which of the first candidate synchronization signal or the second candidate synchronization signal is identified as the valid synchronization signal by identifying the duplex mode as FDD if the first candidate synchronization signal is identified as the valid synchronization signal and identifying the duplex mode as TDD if the second candidate synchronization signal is identified as the valid synchronization signal.

In Example 77, the subject matter of Example 75 can optionally include wherein the decision circuit is configured to analyze the first candidate synchronization signal and the second candidate synchronization signal to identify the valid synchronization signal by determining which of the first candidate synchronization signal or the second candidate synchronization signal has a higher correlation with one or more predefined synchronization signals, and identifying the valid synchronization signal based on which has the higher correlation.

In Example 78, the subject matter of Example 77 can optionally include wherein the decision circuit is configured to determine which of the first candidate synchronization signal or the second candidate synchronization signal has the higher correlation with the one or more predefined synchronization signals by comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal, identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric, and identifying which of the first correlation metric or the second correlation metric has higher amplitude to determine which of the first candidate synchronization signal or the second candidate synchronization signal has the higher correlation with the plurality of predefined synchronization signals.

In Example 79, the subject matter of any one of Examples 70 to 72 can optionally include wherein the first detection circuit is configured to evaluate the signal data of the carrier channel to identify the timing location of the synchronization signal within the signal data by comparing the signal data to a plurality of predefined synchronization signals to identify the timing location as the location of one of the plurality of predefined synchronization signals in the signal data.

In Example 80, the subject matter of Example 79 can optionally include wherein the plurality of predefined synchronization signals are Primary Synchronization Signals (PSSs).

In Example 81, the subject matter of Example 79 can optionally include wherein the first detection circuit is configured to compare the signal data to the plurality of predefined synchronization signals to identify the timing location as the location of one of the plurality of predefined synchronization signals in the signal data by calculating the cross-correlation between the signal data and each of the plurality of predefined synchronization signals to obtain a plurality of cross-correlations, and identifying the timing location as a peak value of one of the plurality of cross-correlations.

In Example 82, the subject matter of any one of Examples 70 to 72 can optionally include wherein the decision circuit is configured to analyze the first candidate synchronization signal and the second candidate synchronization signal to identify the valid synchronization signal by comparing the first candidate synchronization signal and the second candidate synchronization signal to a plurality of predefined synchronization signals to obtain a correlation metric for the first candidate synchronization signal and a correlation metric for the second candidate synchronization signal, and comparing the correlation metric for the first candidate synchronization signal to the correlation metric for the second candidate synchronization signal to determine which of the first candidate synchronization signal or the second candidate synchronization signal is the valid synchronization signal.

In Example 83, the subject matter of Example 82 can optionally include wherein the second detection circuit is configured to compare the correlation metric for the first candidate synchronization signal to the correlation metric for the second candidate synchronization signal to determine which of the first candidate synchronization signal or the second candidate synchronization signal is the valid synchronization signal by identifying which of the correlation metric for the first candidate synchronization signal or the correlation metric for the second candidate synchronization signal has a higher magnitude.

In Example 84, the subject matter of any one of Examples 70 to 72 can optionally include wherein the decision circuit is configured to analyze the first candidate synchronization signal and the second candidate synchronization signal to identify the valid synchronization signal by comparing a correlation metric for the first candidate synchronization signal to a correlation metric for the second candidate synchronization signal to identify which of the first candidate synchronization signal or the second candidate synchronization signal has a higher correlation metric, identifying the first candidate synchronization signal as the valid synchronization signal if the first candidate synchronization signal has the higher correlation metric and identifying the second candidate synchronization signal as the valid synchronization signal if the second candidate synchronization signal has the higher correlation metric.

In Example 85, the subject matter of any one of Examples 70 to 84 can optionally include wherein the synchronization signal is a candidate Primary Synchronization Signal (PSS) and the first candidate synchronization signal and the second candidate synchronization signal are candidate Synchronization Signals (SSSs).

In Example 86, the subject matter of any one of Examples 70 to 72 can optionally include wherein the first detection circuit is configured to evaluate the signal data of the carrier channel to identify the timing location of the synchronization signal within the signal data by performing PSS detection on the signal data, and wherein the second detection circuit is configured to extract the first candidate synchronization signal from the first candidate timing location of the signal data and extract the second candidate synchronization signal from the second candidate timing location of the signal data by performing SSS detection.

In Example 87, the subject matter of Example 86 can optionally include wherein the decision circuit is further configured to aggregate PSS detection results and SSS detection results to obtain cell scan results for the carrier channel, the circuit arrangement further including radio communication circuitry configured to perform radio communications based on the cell scan results.

In Example 88, the subject matter of any one of Examples 70 to 87 can optionally include wherein the second detection circuit is further configured to perform channel estimation with the synchronization signal to obtain a channel estimate, and perform channel correction on the first candidate synchronization signal or the second candidate synchronization signal with the channel estimate.

In Example 89, the subject matter of Example 88 can optionally include wherein the second detection circuit is further configured to perform ghost cell detection with the channel estimate.

In Example 90, the subject matter of any one of Examples 70 to 89 can optionally include wherein the first detection circuit is further configured to evaluate the signal data to identify one or more additional timing locations of one or more additional synchronization signals within the signal data, and wherein the second detection circuit is further configured to extract one or more additional candidate synchronization signals from the signal data using the one or more additional timing locations as reference points, and wherein the decision circuit is configured to analyze the first candidate synchronization signal and the second candidate synchronization signal to identify the valid synchronization signal by analyzing the first candidate synchronization signal, the second candidate synchronization signal, and the one or more additional synchronization signals to identify the valid synchronization signal.

In Example 91, the subject matter of any one of Examples 70 to 90 can optionally include wherein the carrier channel is a Long Term Evolution (LTE) carrier channel.

In Example 92, the subject matter of Example 70 can optionally further include radio communication circuitry configured to wirelessly receive the signal data on the carrier.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement comprising:
    a first detection circuit configured to evaluate signal data of a carrier channel to identify a timing location of a synchronization signal within the signal data;
    a second detection circuit configured to, using the timing location as a reference point, extract a first candidate synchronization signal from a first candidate timing location of the signal data and to extract a second candidate synchronization signal from a second candidate timing location of the signal data; and
    a decision circuit configured to analyze the first detection synchronization signal and the second candidate synchronization signal to determine a duplex mode of the carrier channel by determining which of the first candidate synchronization signal or the second candidate synchronization signal has a higher correlation with one or more predefined synchronization signals by:
        comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal;
        identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric; and
        identifying which of the first correlation metric or the second correlation metric is higher to determine which of the first candidate synchronization signal or the second candidate synchronization signal has the higher correlation with the plurality of predefined synchronization signals.

2. The circuit arrangement of claim 1, further comprising a radio frequency (RF) transceiver and an antenna and configured as a radio communication device.

3. The circuit arrangement of claim 1, wherein the first candidate timing location corresponds to a frequency division duplex (FDD) mode and the second candidate timing location corresponds to a time division duplex (TDD) mode.

4. The circuit arrangement of claim 3, wherein the decision circuit is configured to analyze the first detection synchronization signal and the second candidate synchronization signal to determine the duplex mode of the carrier channel by:
determining the duplex mode as FDD if the first candidate synchronization signal produces the higher correlation and determining the duplex mode as TDD if the second candidate synchronization signal produces the higher correlation.

5. The circuit arrangement of claim 1, wherein the first detection circuit is configured to evaluate the signal data of the carrier channel to identify the timing location of the synchronization signal within the signal data by:
comparing the signal data to a plurality of predefined synchronization signals to identify the timing location as the location of one of the plurality of predefined synchronization signals in the signal data.

6. The circuit arrangement of claim 1, wherein the first detection circuit is configured to evaluate the signal data of the carrier channel to identify the timing location of the synchronization signal within the signal data by performing Primary Synchronization Signal (PSS) detection on the signal data, and wherein the second detection circuit is configured to extract the first candidate synchronization signal from the first candidate timing location of the signal data and extract the second candidate synchronization signal from the second candidate timing location of the signal data by performing Secondary Synchronization Signal (SSS) detection.

7. The circuit arrangement of claim 6, wherein the decision circuit is further configured to:
aggregate PSS detection results and SSS detection results to obtain cell scan results for the carrier channel, the circuit arrangement further comprising radio communication circuitry configured to perform radio communications based on the cell scan results.

8. The circuit arrangement of claim 1, wherein the first detection circuit is further configured to evaluate the signal data to identify one or more additional timing locations of one or more additional synchronization signals within the signal data,
and the second detection circuit is further configured to extract one or more additional candidate synchronization signals from candidate timing locations relative using the one or more further additional locations as reference points,
and wherein the decision circuit is configured to analyze the first candidate synchronization signal and the second candidate synchronization signal to determine the duplex mode of the carrier channel by analyzing the first candidate synchronization signal, the second candidate synchronization signal, and the one or more additional synchronization signals to determine the duplex mode of the carrier channel.

9. A circuit arrangement comprising:
a first detection circuit configured to evaluate signal data of a carrier channel to identify a timing location of a synchronization signal within the signal data;
a second detection circuit configured to, using the timing location as a reference point, extract a first candidate synchronization signal and a second candidate synchronization signal from the signal data; and
a decision circuit configured to analyze the first candidate synchronization signal and the second candidate synchronization signal to identify which of the first candidate synchronization signal or the second candidate synchronization signal is a valid synchronization signal, and further configured to determine a duplex mode of the carrier channel based on which of the first candidate synchronization signal or the second candidate synchronization signal is identified as the valid synchronization signal by:
determining which of the first candidate synchronization signal or the second candidate synchronization signal has a higher correlation with one or more predefined synchronization signals; and
identifying the valid synchronization signal based on which has the higher correlation by:
comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal;
identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric; and
identifying which of the first correlation metric or the second correlation metric has higher amplitude to determine which of the first candidate synchronization signal or the second candidate synchronization signal has the higher correlation with the plurality of predefined synchronization signals.

10. The circuit arrangement of claim 9, further comprising a radio frequency (RF) transceiver and an antenna and configured as a radio communication device.

11. The circuit arrangement of claim 9, wherein the second detection circuit is configured to extract the first candidate synchronization signal and the second candidate synchronization signal from the signal data by:
extracting the first candidate synchronization signal from a first candidate timing location of the signal data and extracting the second candidate synchronization signal from a second candidate timing location of the signal data.

12. The circuit arrangement of claim 11, wherein the first candidate synchronization signal corresponds to a synchronization signal location for a frequency division duplexing (FDD) schedule and the second candidate synchronization signal corresponds to a synchronization signal location for a time division duplexing (TDD) schedule.

13. The circuit arrangement of claim 12, wherein the decision circuit is configured to determine the duplex mode of the carrier channel based on which of the first candidate synchronization signal or the second candidate synchronization signal is identified as the valid synchronization signal by:
identifying the duplex mode as FDD if the first candidate synchronization signal is identified as the valid synchronization signal and identifying the duplex mode as TDD if the second candidate synchronization signal is identified as the valid synchronization signal.

14. The circuit arrangement of claim 9, wherein the first detection circuit is configured to evaluate the signal data of the carrier channel to identify the timing location of the synchronization signal within the signal data by:
comparing the signal data to a plurality of predefined synchronization signals to identify the timing location as the location of one of the plurality of predefined synchronization signals in the signal data.

15. The circuit arrangement of claim 9, wherein the first detection circuit is further configured to evaluate the signal data to identify one or more additional timing locations of one or more additional synchronization signals within the signal data;
and wherein the second detection circuit is further configured to extract one or more additional candidate synchronization signals from the signal data using the one or more additional timing locations as reference points;
and wherein the decision circuit is configured to analyze the first candidate synchronization signal and the second candidate synchronization signal to identify the valid synchronization signal by:
analyzing the first candidate synchronization signal, the second candidate synchronization signal, and the one or more additional synchronization signals to identify the valid synchronization signal.

16. The circuit arrangement of claim 9, wherein the first detection circuit is configured to evaluate the signal data of the carrier channel to identify the timing location of the synchronization signal within the signal data by performing Primary Synchronization Signal (PSS) detection on the signal data;
and wherein the second detection circuit is configured to extract the first candidate synchronization signal from the first candidate timing location of the signal data and extract the second candidate synchronization signal from the second candidate timing location of the signal data by performing Secondary Synchronization Signal (SSS) detection.

17. A method of performing a radio scan, the method comprising:
evaluating signal data of a carrier channel to identify a timing location of a synchronization signal within the signal data;
using the timing location as a reference point, extracting a first candidate synchronization signal from a first candidate timing location of the signal data and extracting a second candidate synchronization signal from a second candidate timing location of the signal data; and
analyzing the first candidate synchronization signal and the second candidate synchronization signal to determine a duplex mode of the carrier channel by determining which of the first candidate synchronization signal or the second candidate synchronization signal has a higher correlation with one or more predefined synchronization signals, wherein comprises:
comparing the first candidate synchronization signal and the second candidate synchronization signal with each of a plurality of predefined synchronization signals to obtain a plurality of correlation metrics for the first candidate synchronization signal and a plurality of correlation metrics for the second candidate synchronization signal;
identifying the highest-valued correlation metric of the plurality of correlation metrics for the first candidate synchronization signal as a first correlation metric and identifying the highest-valued correlation metric of the plurality of correlation metrics for the second candidate synchronization signal as a second correlation metric; and
identifying which of the first correlation metric or the second correlation metric is higher to determine which of the first candidate synchronization signal or the second candidate synchronization signal has the higher correlation with the plurality of predefined synchronization signals.

18. The method of claim 17, wherein the first candidate timing location corresponds to a frequency division duplex (FDD) mode and the second candidate timing location corresponds to a time division duplex (TDD) mode.

19. The method of claim 18, wherein analyzing the first candidate synchronization signal and the second candidate synchronization signal to determine the duplex mode of the carrier channel comprises:
determining the duplex mode as FDD if the first candidate synchronization signal produces the higher correlation and determining the duplex mode as TDD if the second candidate synchronization signal produces the higher correlation.

* * * * *